(12) United States Patent
Rash et al.

(10) Patent No.: US 9,395,990 B2
(45) Date of Patent: Jul. 19, 2016

(54) MODE DEPENDENT PARTIAL WIDTH LOAD TO WIDER REGISTER PROCESSORS, METHODS, AND SYSTEMS

(71) Applicant: Intel Corporation, Santa Clara, CA (US)

(72) Inventors: William C. Rash, Saratoga, CA (US); Yazmin A. Santiago, Beaverton, OR (US); Martin Guy Dixon, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 360 days.

(21) Appl. No.: 13/931,070

(22) Filed: Jun. 28, 2013

(65) Prior Publication Data

US 2015/0006856 A1    Jan. 1, 2015

(51) Int. Cl.
*G06F 9/30* (2006.01)
*G06F 9/38* (2006.01)

(52) U.S. Cl.
CPC .................................. *G06F 9/30145* (2013.01)

(58) Field of Classification Search
None
See application file for complete search history.

(56) References Cited

U.S. PATENT DOCUMENTS

| 6,122,725 | A | 9/2000 | Roussel et al. |
| 6,542,988 | B1 | 4/2003 | Tremblay et al. |
| 7,568,087 | B2 | 7/2009 | Kadambi et al. |
| 8,392,693 | B2 | 3/2013 | Henry et al. |
| 2007/0186210 | A1 | 8/2007 | Hussain et al. |
| 2012/0089819 | A1* | 4/2012 | Chaudhry ............. G06F 9/3838 712/214 |
| 2013/0124828 | A1* | 5/2013 | Chou ...................... G06F 9/383 712/207 |

FOREIGN PATENT DOCUMENTS

| TW | 201241744 A | 10/2012 |
| TW | 201243726 A | 11/2012 |
| WO | 2014/209747 A1 | 12/2014 |

OTHER PUBLICATIONS

Notice of Allowance received for Taiwan Patent Application No. 103121018, mailed on Nov. 13, 2015, 2 pages of Taiwan NOA and 1 page of Search report.
International Preliminary Report on Patentability and Written Opinion received for PCT Patent Application No. PCT/US2014/043159, mailed on Jan. 7, 2016, 7 pages.
International Search Report and Written Opinion received for PCT Patent Application No. PCT/US2014/043159, mailed on Sep. 30, 2014, 10 pages.

* cited by examiner

*Primary Examiner* — Scott Sun
(74) *Attorney, Agent, or Firm* — Vecchia Patent Agent, LLC

(57) ABSTRACT

A method of an aspect is performed by a processor. The method includes receiving a partial width load instruction. The partial width load instruction indicates a memory location of a memory as a source operand and indicates a register as a destination operand. The method includes loading data from the indicated memory location to the processor in response to the partial width load instruction. The method includes writing at least a portion of the loaded data to a partial width of the register in response to the partial width load instruction. The method includes finishing writing the register with a set of bits stored in a remaining width of the register that have bit values that depend on a partial width load mode of the processor. The partial width load instruction does not indicate the partial width load mode. Other methods, processors, and systems are also disclosed.

25 Claims, 15 Drawing Sheets

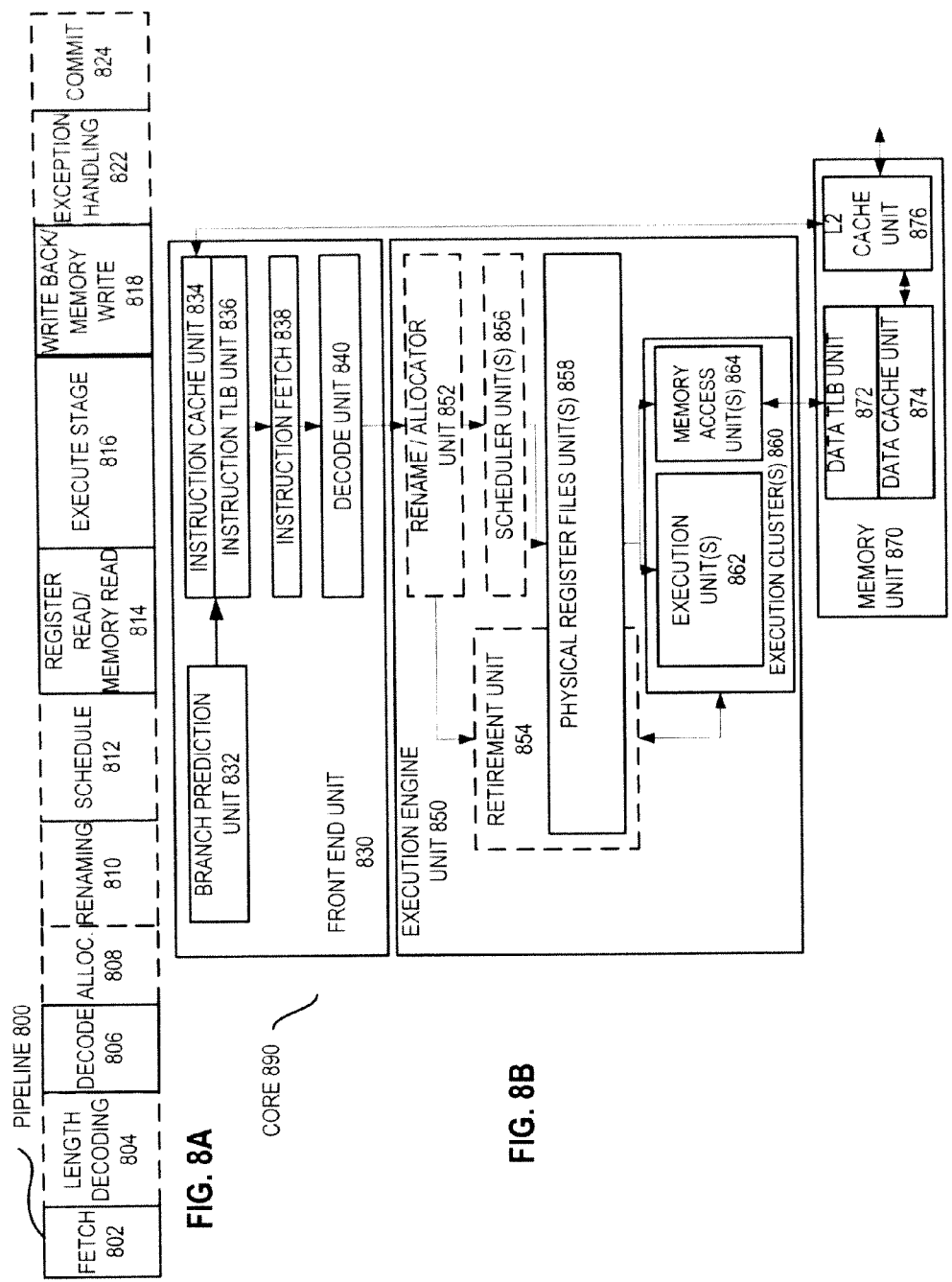

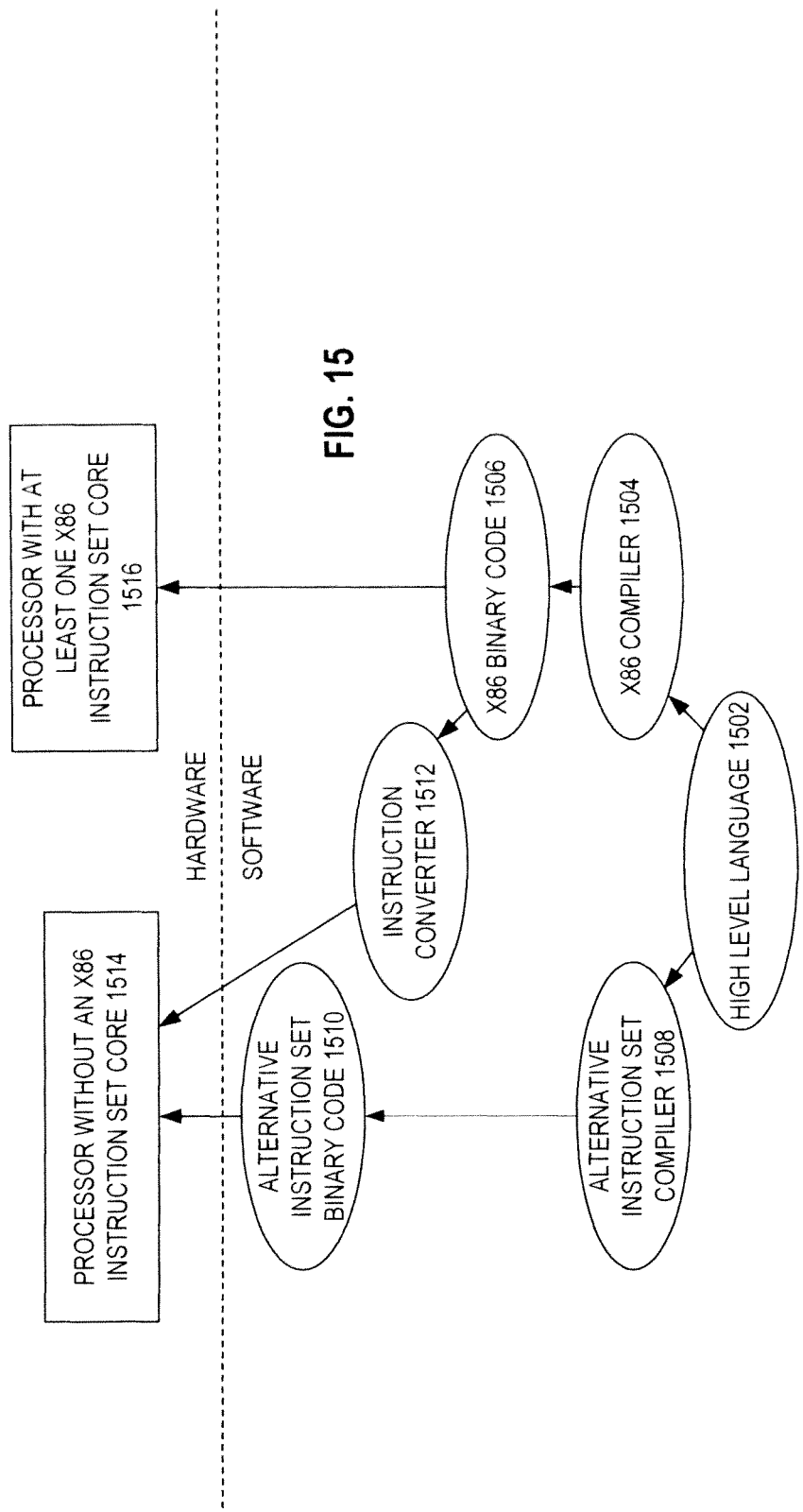

MODE DEPENDENT PARTIAL WIDTH LOAD TO WIDER REGISTER PROCESSORS, METHODS, AND SYSTEMS

BACKGROUND

1. Technical Field

Embodiments described herein generally relate to processors. In particular, embodiments described herein generally relate to loading data from memory in processors.

2. Background Information

The instruction set of a processor typically includes a variety of different types of instructions that the processor is able to execute or perform. For example, commonly the instruction set may include various arithmetic instructions, various logical instructions, various load instructions to load data from memory into the processor, etc.

One challenge is that the number of instructions that may be included in the instruction set is generally limited. Each of the instructions may include an operation code or opcode. The opcodes may represent portions of the instructions that are used to specify the particular instructions and/or operations to be performed. For example, a given data load from memory instruction may have a given unique opcode to distinguish it from other types of instructions and allow the processor to recognize it. The opcode may represent a group of bits of a given length in one or more fields or locations within the instruction format. Often, it is desirable to try to keep the number of bits of the opcodes relatively short, while providing the desired number of instructions/operations. Long opcodes tend to increase the size and/or complexity of the decoder. In addition, long opcodes tend to increase overall instruction length, which may cause the instructions to use more program space and take up more space in caches. The number of different instructions that can be uniquely identified with a given opcode length and/or instruction length is often more limited than desirable. Additional instructions typically cannot be continually added to the instruction set without ultimately running out of available opcodes or increasing the length of the instructions in variable instruction length architectures.

In some cases, different instructions and/or operations may have the same opcode (or same portion of the opcode) but may include one or more additional bits to differentiate between different versions of the instruction and/or operation. Potential drawbacks to this approach is that it may tend to increase the instruction length, or in some cases there may not be available room within the instruction length to accommodate the additional bit(s) to distinguish between the different versions of the instruction/operation

BRIEF DESCRIPTION OF THE DRAWINGS

The invention may best be understood by referring to the following description and accompanying drawings that are used to illustrate embodiments. In the drawings:

FIG. 8A is a block diagram illustrating both an exemplary in-order pipeline and an exemplary register renaming, out-of-order issue/execution pipeline according to embodiments of the invention.

FIG. 8B is a block diagram illustrating both an exemplary embodiment of an in-order architecture core and an exemplary register renaming, out-of-order issue/execution architecture core to be included in a processor according to embodiments of the invention.

FIG. 15 is a block diagram contrasting the use of a software instruction converter to convert binary instructions in a source instruction set to binary instructions in a target instruction set according to embodiments of the invention.

DETAILED DESCRIPTION OF EMBODIMENTS

In some embodiments, a processor may have two or more modes to handle a given instruction and/or a given opcode in two or more different corresponding ways, for example, two or more modes to handle a partial width load from memory instruction in two or more different corresponding ways. In the following description, numerous specific details are set forth (e.g., specific instruction operations, processor configurations, microarchitectural details, sequences of operations, etc.). However, embodiments may be practiced without these specific details. In other instances, well-known circuits, structures and techniques have not been shown in detail to avoid obscuring the understanding of the description.

Figure 1:
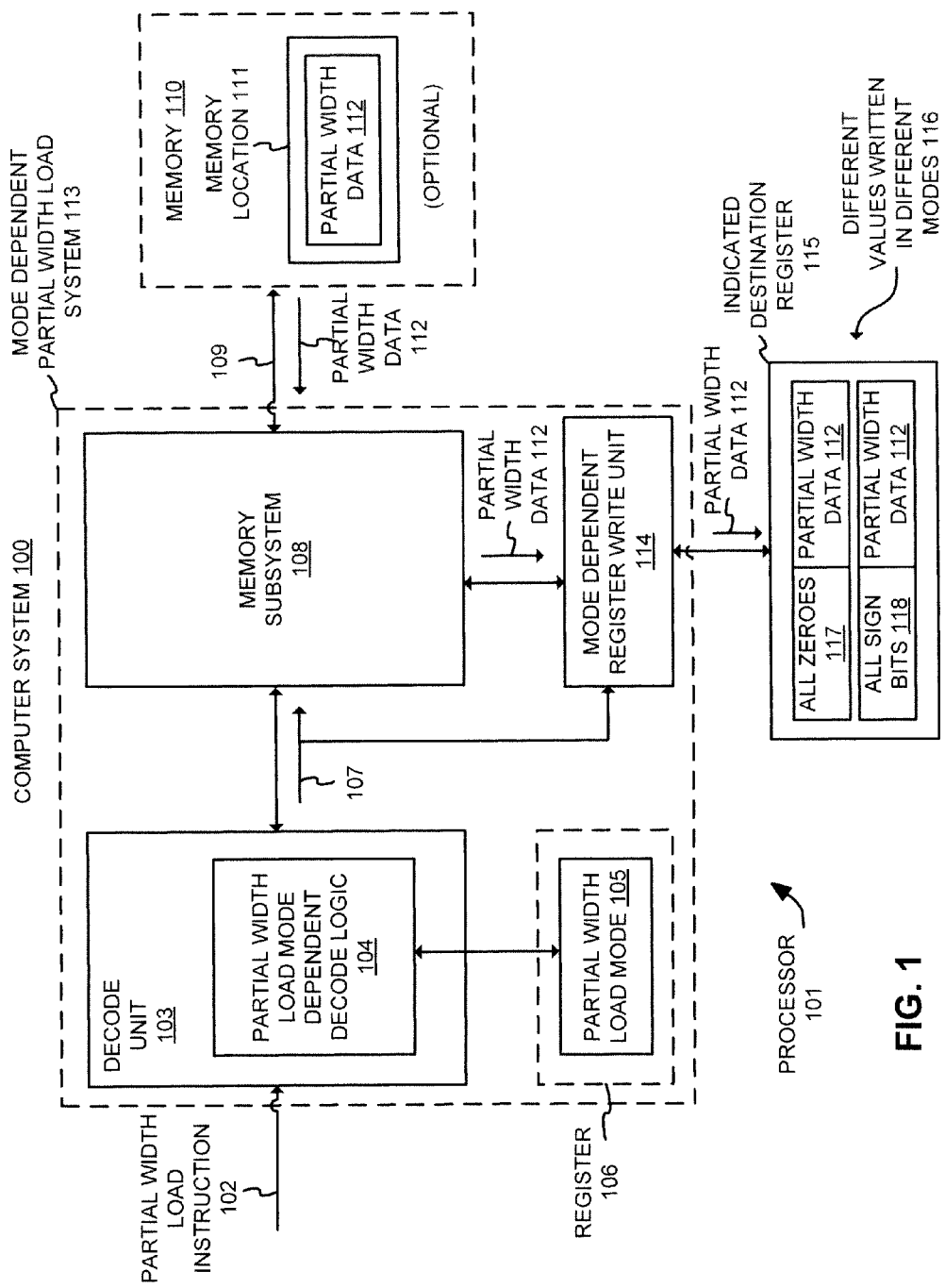
FIG. 1 is a block diagram of an embodiment of a computer system having a processor to perform a partial width load instruction.

FIG. 1 is a block diagram of an embodiment of a computer system 100. In various embodiments, the computer system may represent a desktop computer, laptop computer, notebook computer, tablet computer, netbook, smartphone, personal digital assistant, cellular phone, server, network device (e.g., router or switch), Mobile Internet device (MID), media player, smart television, set-top box, video game controller, or other type of electronic device.

The computer system includes an embodiment of a processor 101. In some embodiments, the processor may be a general-purpose processor. For example, the processor may be a general-purpose processor of the type commonly used as a central processing unit (CPU). In other embodiments, the processor may be a special-purpose processor. Examples of suitable special-purpose processors include, but are not limited to, co-processors, graphics processors, communications processors, network processors, cryptographic processors, embedded processors, and digital signal processors (DSPs), to name just a few examples. The processor may be any of various complex instruction set computing (CISC) processors, various reduced instruction set computing (RISC) processors, various very long instruction word (VLIW) processors, various hybrids thereof, or other types of processors entirely.

The computer system also includes an embodiment of a memory 110. The memory is coupled with the processor 101 by a coupling or interconnection mechanism 109. Examples of suitable coupling or interconnection mechanisms include, but are not limited to, one or more interconnects, buses, hubs, memory controllers, chipsets, chipset components, and the like, and various combinations thereof. The memory may include one or more memory devices of either the same or different types. One commonly used type of memory that is suitable for embodiments is dynamic random access memory (DRAM), although other types of memory (e.g., flash memory) may alternatively be used. The memory may have software stored therein, for example, one or more operating systems (OS) and one or more applications (not shown). During operation, instructions of the software may be provided to the processor and run on the processor.

As shown, a partial width load instruction 102 may be provided to the processor 101. For example, a fetch unit (not shown) may fetch the partial width load instruction. The partial width load instruction may represent a machine code instruction, assembly language instruction, macroinstruction, or control signal of an ISA of the apparatus. The partial width load instruction may explicitly specify (e.g., through one or more fields or a set of bits), or otherwise indicate (e.g., implicitly indicate), a memory location 111 in the memory 110 as a source operand, and may specify or otherwise indicate a destination register 115 as a destination operand where partial width data 112 loaded from the memory is to be stored. The term "partial width data" is used herein to refer to the data filling or being only a partial width of the destination register 115 where the data is to be stored.

The processor includes a decode unit 103. The decode unit may also be referred to as a decoder or decode logic. The decode unit may receive the partial width load instruction. The decode unit may be operable to decode relatively higher-level instructions (e.g., machine code instructions, assembly language instructions, macroinstructions, etc.), and output one or more corresponding relatively lower-level instructions or control signals (e.g., one or more microinstructions, micro-operations, micro-code entry points, etc.). The lower-level instruction(s) or control signal(s) may reflect, represent, and/or be derived from the relatively higher-level instructions, and may implement the higher-level instruction through lower-level operation(s) (e.g., circuit-level or hardware-level operations). The decode unit may be implemented using various different mechanisms including, but not limited to, microcode read only memories (ROMs), look-up tables, hardware implementations, programmable logic arrays (PLAs), other mechanisms used to implement decode units known in the art, and combinations thereof.

In other embodiments, an instruction emulator, translator, morpher, interpreter, or converter may be used instead of, or in addition to, the decode unit 103. The instruction converter may emulate, translate, morph, interpret, or otherwise convert the instruction into one or more corresponding derived instructions or control signals. Various different types of such instruction converters are known in the arts, and may be implemented in hardware, firmware, software, or a combination thereof. In some embodiments, an instruction converter may convert a received higher level instruction into one or more intermediate level instructions, and a decode unit may decode the one or more intermediate level instructions into one or more lower-level instructions or control signals capable of being performed by native logic of the processor.

As shown, the decode unit is part of a mode dependent partial width load system 113 of the processor. In some embodiments, two or more modes may be used to handle the partial width load instruction and/or its opcode in two or more different corresponding ways. Advantageously, this may help to allow different operations to be performed without needing to utilize a further opcode, which in some cases can be challenging as discussed in the background section. The decode unit may be coupled with, or otherwise in communication with, a partial width load mode 105. In some embodiments, the partial width load mode may include one or more bits to indicate one of a multiple different partial width load modes. In one aspect, a single bit may be used to indicate either of two different partial width load modes. In another aspect, two or more bits may be used to indicate any one of two, at least three, at least four, or optionally more than four different partial width load modes. In some embodiments, the one or more bits may be stored in a register (e.g., a control, status, or configuration register) 106 or another on-die storage location. Alternatively, the partial width load mode may optionally be included in one or more separate or isolated bits not necessarily in a control, status, or configuration register. As will be explained further below, a software module (e.g., a user-level application module, an operating system module, a virtual machine monitor module, a privileged software module, or the like) may change the partial width load mode 105 (e.g., by changing the one or more bits) to one that is appropriate, desired, or intended, for the partial width load instruction 102 (e.g., the software utilizing the partial width load instruction).

The decode unit and/or the processor may access the partial width load mode to determine the current partial width load mode to use, and the decode unit may decode the partial width load instruction according to the determined partial width load mode. In some embodiments, the partial width load mode may be used to provide different meanings, interpretations, and/or operations for the partial width load instruction and/or its opcode. In some embodiments, the decode unit may include partial width load mode dependent decode logic 104 to decode the partial width load instruction in a way that depends on, is based on, and/or is consistent with, the current partial width load mode associated with the instruction (e.g., the mode at the time the instruction is decoded). For example, a first set of one or more instructions or control signals may be decoded from the partial width load instruction in a first partial width load mode, whereas a second different set of one or more instructions or control signals may be decoded from the partial width load instruction (e.g., the same opcode) in a second different partial width load mode. Mode dependent instructions or control signals 107 may be output from the decode unit consistent with the current mode 105.

In some embodiments, the partial width load instruction may not specify or otherwise indicate the partial width load mode 105 (e.g., there may be no bits of the instruction to select or differentiate between multiple different flavors of the instruction/operation or otherwise specify the mode). This generally helps to avoid increasing the instruction length, may potentially allow use of the technique where the instruction length does not permit such additional bits, may potentially reduce or limit the number of bits to be decoded, or offer other potential advantages. In some embodiments, it may be impossible to tell from examining any or all of the bits of the partial width load instruction which partial width load mode to use.

Referring again to FIG. 1, a memory subsystem 108 is coupled with the decode unit 103 and with the memory 110. Various conventional memory subsystems known in the arts are suitable. The memory subsystem may be operable, in response to and/or as a result of the partial width load instruction 102 (e.g., in response to one or more decoded instruction(s) or control signal(s) corresponding to the current partial width load mode 105), to load data from the indicated memory location 111 into the processor. As previously mentioned, the partial width load instruction may specify or otherwise indicate the memory location 111 having the partial width data 112. The partial width load instruction may also specify or otherwise indicate the destination register 115 where the partial width data is to be stored.

An embodiment of a partial width load mode dependent register write unit 114 is coupled with the decode unit 103, with the memory subsystem 108, and with the destination register 115. For simplicity, the partial width load mode dependent register write unit may also be referred to simply as a mode dependent register write unit or a register write unit. The mode dependent register write unit may be operable, in response to and/or as a result of the partial width load instruction 102 (in response to one or more decoded instruction(s) or control signal(s) 107 corresponding to the current partial width load mode 105), to write or otherwise access the register 115 to have a result stored therein that is dependent on and/or consistent with the partial width load mode. In some embodiments, the mode dependent register write unit may be operable to write at least a portion of the loaded partial width data 112 to a partial width of the register, and may be operable to finish or complete the writing of the register with a set of bits 117, 118 stored in a remainder width of the register that have bit values that dependent on and/or consistent with the corresponding partial width load mode. The mode dependent register write unit and/or the processor may include specific or particular logic (e.g., circuitry or other hardware potentially combined with one or more of firmware and/or software) responsive to the partial width load instruction.

Various combinations of different types of partial width load modes are suitable for different embodiments. Examples include, but are not limited to, a sign extended partial width load mode, a zero extended partial width load mode, a merging partial width load mode, and other partial width load modes known in the arts. In the sign extended partial width load mode, a sign bit of the partial width data (e.g., a most significant bit having a value of either binary zero or binary one) may be copied, extended, or otherwise stored or written to a remaining width of the register not occupied by the partial width data. In the zero extended partial width load mode, binary zeroes may be inserted, extended, or otherwise stored or written to a remaining width of the register not occupied by the partial width data. In the merging partial width load mode, the partial width data may be merged with initial or preexisting bits or data already stored in the register at the time of the register write. This initial or preexisting data need not be modified or overwritten. For example, the merging partial width load mode may store the partial width to a lowest order portion of the register overwriting initial or preexisting data in that lowest order portion, and may retain initial or preexisting data in a remaining highest order portion of the register. In various embodiments, a combination of two or more of these or other types of partial width load modes may be used. Different corresponding values 116 may be written to the destination register in different modes. In the illustrated example, in a zero extended partial width load mode, partial width data 112 may be included in part of the destination register (e.g., a lowest order half or other portion) and all zeros 117 may be stored in another part of the destination register (e.g., a highest order portion). In a sign extended partial width load mode, partial width data 112 may be included in part of the destination register (e.g., a lowest order half or other portion) and sign bits 118 (e.g., based on the most significant bit of the partial width data 112) may be stored in another part of the destination register (e.g., a highest order half or other portion). In other embodiments, other types or combinations of different partial width loads may be used. For example, in another embodiment a merging extending partial width load mode (see e.g., FIG. 3), or other type of partial width load mode, may be used instead of one of the illustrated modes, or as an additional third type of partial width load mode.

To avoid obscuring the description and concepts, a simplified processor 101 has been shown and described. The apparatus may include various other well-known components commonly found in processors. Examples of such components include, but are not limited to, a branch prediction unit, an instruction fetch unit, instruction and data caches, second or higher level caches, instruction and data translation lookaside buffers, prefetch buffers, microinstruction queues, microinstruction sequencers, a register renaming unit, an instruction scheduling unit, bus interface units, a retirement unit, other components included in processors, and various combinations thereof. There are literally numerous different combinations and configurations of components in processors, and embodiments are not limited to any particular combination or configuration.

Figure 2:
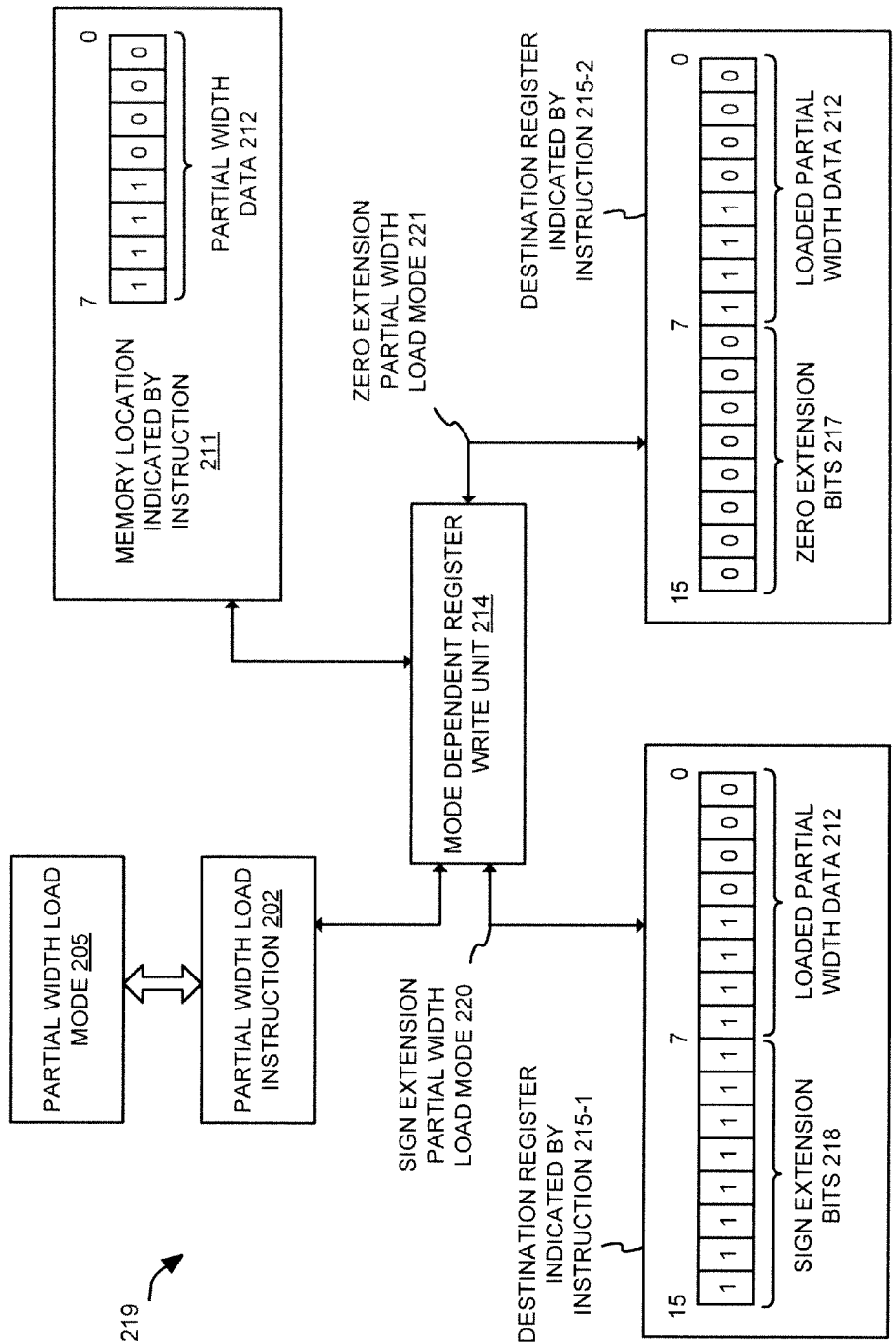
FIG. 2 is a block diagram of a first example embodiment of a partial with load operation that may be performed according to either a sign extension partial width load mode or a zero extension partial width load mode.

FIG. 2 is a block diagram of a first example embodiment of a partial with load operation 219 that may be performed according to either a sign extension partial width load mode 220 or a zero extension partial width load mode 221. The partial width load operation may be performed in response to a partial width load instruction 202 and an associated partial width load mode 205 (e.g., a partial width load mode at the time the partial width load instruction is decoded).

The partial width load instruction may specify or otherwise indicate a memory location 211 as a source operand, and may specify or otherwise indicate a destination register 215 as a destination operand. The memory location stores partial width data that is to be loaded into the destination register in response to the partial width load instruction. For simplicity of illustration, 8-bit wide partial width data 212 is shown. In the illustrated example, the 8-bit partial width data has, from most significant bit position on the left to least significant bit position on the right, the values "11110000". However, it is to be appreciated that these values are merely examples and that any other possible bit values may alternatively be used. Moreover, in other embodiments, rather than 8-bit wide partial width data, the partial width data may have other widths (e.g., 16-bits, 32-bits, 64-bits, etc.). Similarly, for simplicity of illustration, the illustrated destination register has a width of 16-bits. In other embodiments, the destination register may have other widths (e.g., 32-bits, 64-bits, 128-bits, etc.). In some embodiments, as in this example, the partial width data may be half the width of the destination register, although this is not required. In other embodiments, for example, the partial width data may be 16-bits and the destination register may be 64-bits, or the partial width data may be 8-bits and the destination register may be 32-bits, etc. As another example, the partial width data may be 64-bits and the destination register may be 128-bits.

A mode dependent register write unit 214 is coupled with the destination register 215, is coupled with the memory location 211, and is coupled with the partial width load instruction 202 (e.g., a decode unit). The register write unit may be operable, in response to the partial width load instruction, to perform a write or store to the destination register. The way in which the write or store is performed may depend upon or be based upon the partial width load mode associated with the partial width load instruction. In this first example embodiment, the partial width load mode may indicate either one of a sign extension partial width load mode 220 (on the left in the illustration) or a zero extension partial width load mode 221 (on the right in the illustration). In both of these different types of partial width loads, the partial width data 212 (e.g., the 8-bit partial width data in this example) may be written or stored in the destination register. In the illustrated embodiment, the loaded partial width data is written to the lowest order portion of the destination register, although this is not required. As shown, in either the sign extension partial width load mode 220, or the zero extension partial width load mode 221, the 8-bit partial width data values "11110000" may be stored in bits [7:0] of the destination register 215-1, 215-2. In other embodiments, other sizes of partial width data may be used and/or the partial width data may be written to other portions/positions of the destination register (e.g., a most significant portion, etc.).

In the illustrated embodiment, the highest order portion (e.g., the 8-bit highest order portion in this example) of the destination register is handled differently for the two different types of partial width load operations/modes. For the sign extension partial width load mode 220, the mode dependent register write unit is controlled to write or store sign bits 218 (e.g., the sign bit of the most significant bit of the partial width data) to all remaining more significant bits of the destination register 215-1 not used to store the partial width data. In the illustrated example, bit-7 is the sign bit or most significant bit of the partial width data. In this example, the sign bit is binary one and correspondingly binary one 218 is stored in each of bits [15:8] of the destination register 215-1. For the zero extension partial width load mode 221, the mode dependent register write unit is controlled to write or store all zeros 217 to all remaining more significant bits of the destination register 215-2 not used to store the partial width data. As shown, binary zeros 217 may be stored in each of bits [15:8] of the destination register 215-2. Accordingly, the mode dependent register write unit and/or the processor may finish writing the destination register 215 with bits (e.g., 217 or 218) stored in a portion thereof not used to store the partial width data (e.g., all more significant bits than a lowest order portion used to store the partial width data) that have bit values that depend on the partial width load mode.

Figure 3:
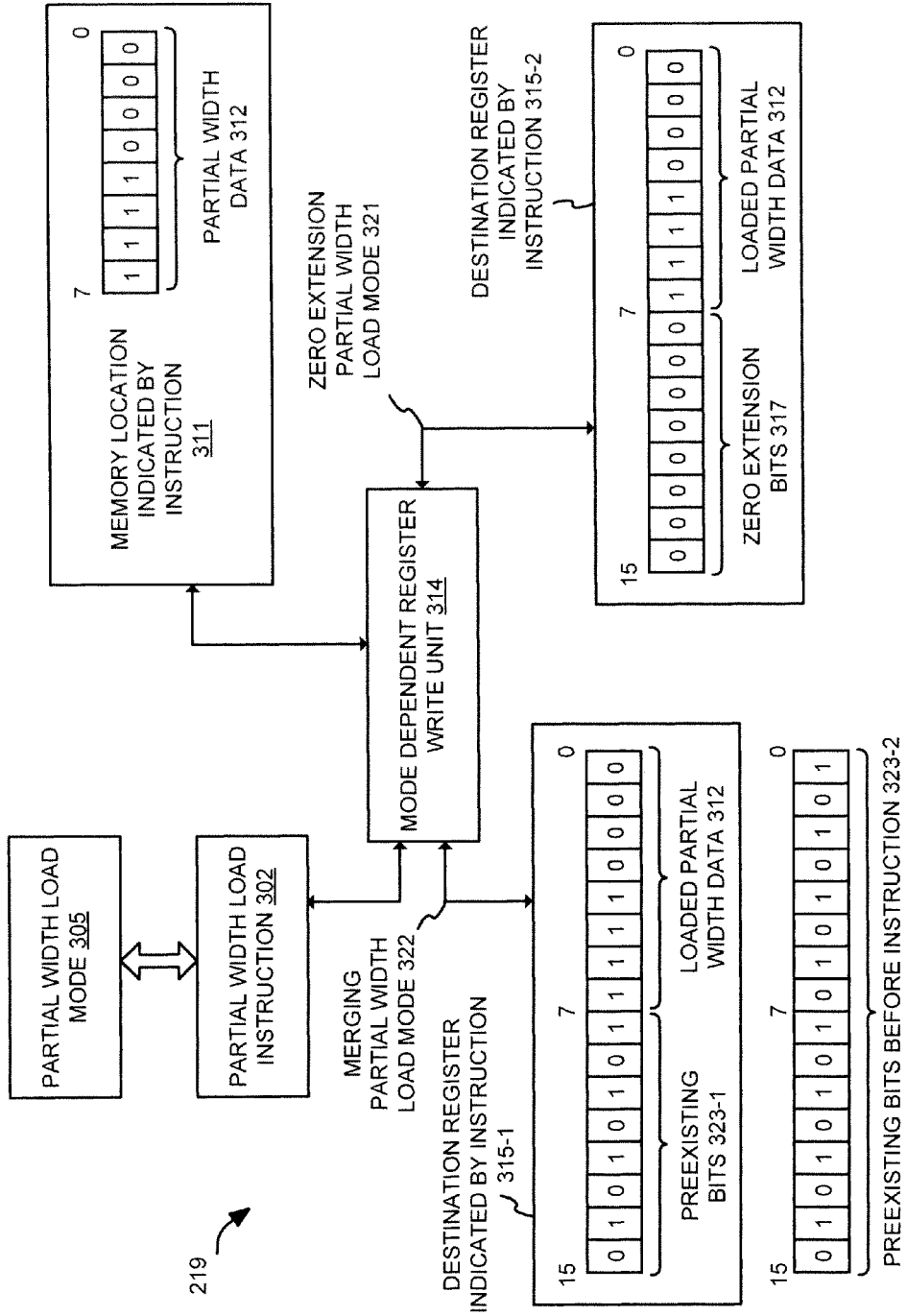
FIG. 3 is a block diagram of a second example embodiment of a partial with load operation that may be performed according to either a merging partial width load mode or a zero extension partial width load mode.

FIG. 3 is a block diagram of a second example embodiment of a partial with load operation 319 that may be performed according to either a merging partial width load mode 322 or a zero extension partial width load mode 321. This second example embodiment has certain similarities to the previously described first example embodiment of FIG. 2. To avoid obscuring the description, the different or additional features and characteristics of the second example embodiment will primarily be described without repeating all the similarities. However, it is to be appreciated that the features and characteristics described above for the first example embodiment of FIG. 2 may also optionally apply to the second example embodiment.

The partial width load operation 319 may be performed in response to a partial width load instruction 302 and an associated partial width load mode 305. The partial width load instruction may specify or otherwise indicate a memory location 311 as a source operand, and may specify or otherwise indicate a destination register 315 as a destination operand. The memory location stores partial width data 312 that is to be loaded into the destination register in response to the partial width load instruction. For simplicity of illustration, in this example, an 8-bit partial width data and a 16-bit destination register are shown, although the scope of the invention is not so limited.

A mode dependent register write unit 314 may be operable, in response to the partial width load instruction, to perform a write or store to the destination register. The way in which the write or store is performed may depend upon or be based upon the partial width load mode associated with the partial width load instruction. In this second example embodiment, the partial width load mode may indicate either one of a merging or merged partial width load mode 322 (on the left in the illustration) or a zero extension partial width load mode 321 (on the right in the illustration). In both of these different types of partial width loads, the partial width data 312 (e.g., the 8-bit partial width data in this example) may be written or stored in the destination register. In the illustrated embodiment, the loaded partial width data is written to the lowest order portion of the destination register, although this is not required. As shown, in either the merging or merged extension partial width load mode 322, or the zero extension partial width load mode 321, the 8-bit partial width data values "11110000" may be stored in bits [7:0] of the destination register 315-1, 315-2. In other embodiments, other sizes of partial width data may be used and/or the partial width data may be written to other portions/positions of the destination register (e.g., a most significant portion, etc.).

In the illustrated embodiment, the highest order portion (e.g., the 8-bit highest order portion in this example) of the destination register 215 is handled differently for the two different types of partial width load operations/modes. For the merging or merged extension partial width load mode 322, the mode dependent register write unit is controlled to finish writing the destination register 315-1 with bits 323-1 stored in a portion thereof not used to store the partial width data (e.g., all more significant bits than the lowest order 8-bits used to store the 8-bit partial width data) that have bit values that depend on the partial width load mode. For example, as shown, the register write unit may finish writing the destination register 315-1 with an initial set of bits (i.e., those bits which were initially in the destination register 315-1 prior to the partial width load instruction) retained in the most significant remainder 8-bit portion of the destination register 315-1. For reference, a set of pre-existing bit values 323-2 that existed before the partial register write instruction was performed are shown. Bits [15:8] of the pre-existing bit values 323-2 have the values "01010101." Notice that these same values "01010101" in bits [15:8] of the pre-existing bit values 323-2 that existed before the partial register write instruction was performed also appear as the same bit values "01010101" in bits [15:8] of the destination register 315-2 after performing the partial register write instruction. The partial width data may be merged or inserted into the destination register replacing some bits while leaving other bits unchanged. For the zero extension partial width load mode 321, the mode dependent register write unit is controlled to write or store all zeros 317 to all remaining more significant bits of the destination register 315-2 not used to store the partial width data. As shown, binary zeros 317 may be stored in each of bits [15:8] of the destination register 315-2.

It is to be appreciated that these are just a few illustrative examples embodiments of suitable types of partial width load modes. Another embodiment is contemplated in which a first mode uses a sign extension partial width load mode and a second mode uses a merged partial width load mode. Yet another embodiment is contemplated in which the embodiment of FIG. 2 adds a further third mode to include a merged partial width load mode. A further embodiment is contemplated in which the embodiment of FIG. 3 adds a further third mode to include a sign extension partial width load mode. Other embodiments may be based on other types of partial width load modes (e.g., ones extending, etc.). Moreover, as previously mentioned, in still other embodiments, the bit widths of the partial width data and/or the destination register may each be either wider or narrower and the partial width data need not be half the width of the destination register.

In some embodiments, the operations of FIG. 2 and/or FIG. 3 may be performed by and/or within the processor of FIG. 1. The details and optional details described above for the processor of FIG. 1 may also optionally apply to the operations of FIG. 2 and/or FIG. 3, which in embodiments may be performed by and/or within such a processor. Alternatively, the operations of FIG. 2 and/or FIG. 3 may be performed by and/or within a similar or different processor. Moreover, the processor of FIG. 1 may perform operations the same as, similar to, or different than those of FIG. 2 and/or FIG. 3.

Figure 4:
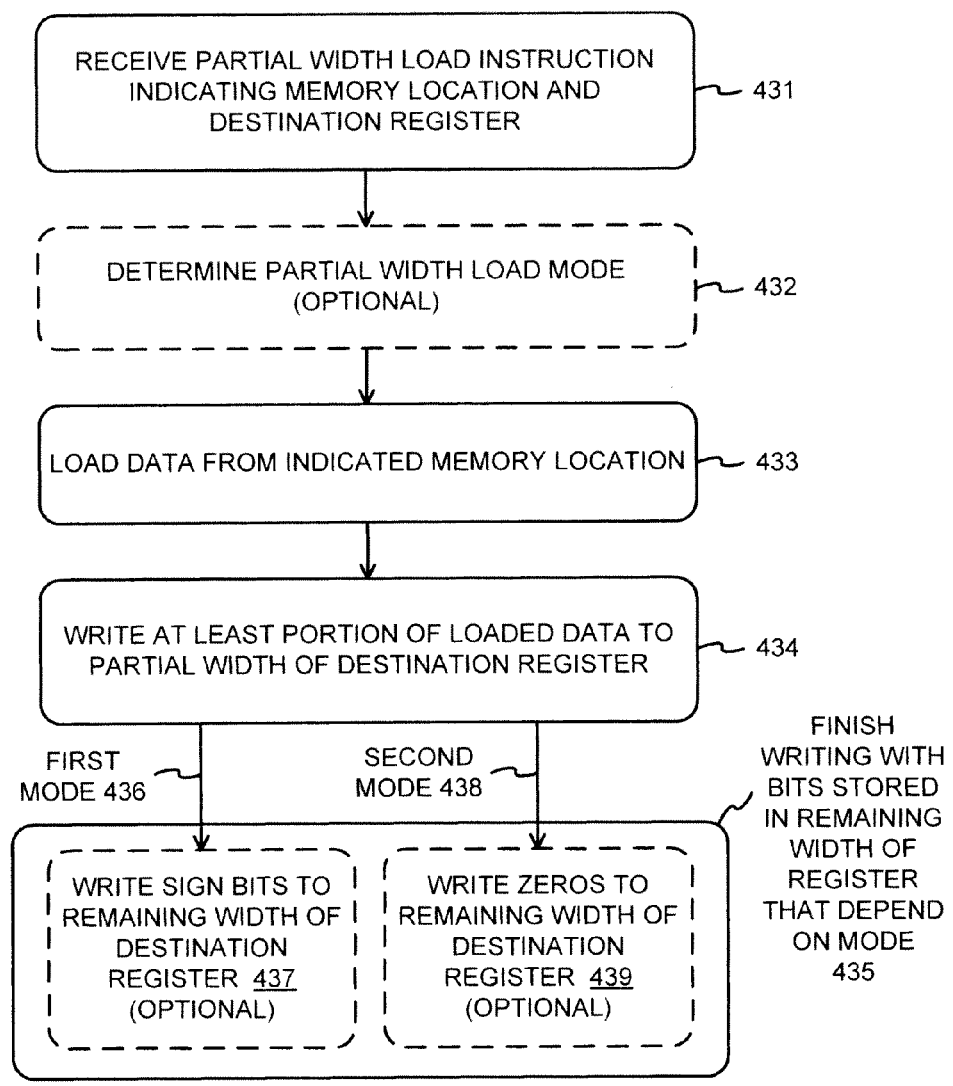
FIG. 4 is a block flow diagram of an embodiment of a method that may be performed by a processor when processing an embodiment of a partial width load instruction.

FIG. 4 is a block flow diagram of an embodiment of a method 430 that may be performed by a processor when processing an embodiment of a partial width load instruction. In some embodiments, the operations and/or method of FIG. 4 may be performed by and/or within the processor of FIG. 1. The components, features, and specific optional details described for the processor of FIG. 1 may also optionally apply to the operations and/or method of FIG. 4 which may be performed by and/or within such a processor. Alternatively, the operations and/or method of FIG. 4 may be performed by and/or within a similar or different processor. Moreover, the processor of FIG. 1 may perform operations and/or methods the same as, similar to, or different than those of FIG. 4.

The method includes receiving the partial width load instruction, at block 431. In various aspects, the instruction may be received at a processor, an instruction processing apparatus, or a portion thereof (e.g., an instruction fetch unit, a decode unit, etc.). In various aspects, the instruction may be received from an off-die source (e.g., from a main memory, interconnect, etc.), or from an on-die source (e.g., from a fetch unit, an instruction cache, etc.). In some embodiments, the partial width load instruction may specify or otherwise indicate a memory location as a source operand, and may specify or otherwise indicate a register as a destination operand. In some embodiments, the partial width load instruction may not specify or otherwise indicate a partial width load mode (e.g., may not have bit(s) to specify a mode or select a predetermined mode).

The method optionally includes checking or otherwise determining the partial width load mode, at block 432. Alternatively, the partial width load mode may be automatically imposed without a need to check or determine it. The method also includes loading data from the indicated memory location to the processor in response to the partial width load instruction, at block 433.

The method includes writing at least a portion of the loaded data to a partial width of the destination register in response to the partial width load instruction, at block 434. Either all of the loaded data may be written or only a portion of it depending on the implementation of the instruction. In one example embodiment, 32-bits of loaded data may be written to a lowest order 32-bit half of a 64-bit destination register. In other embodiments, other sizes of partial width data and/or destination registers may optionally be used.

The method also includes finishing writing the destination register with a set of bits stored in a remaining width of the destination register (i.e., a portion not used to store the partial width data) that have bit values that depend on the partial width load mode of the processor, at block 435. Those bits may be different (i.e., have different bit values) from one mode to the other. In some embodiments, in a first mode 436, this may optionally include copying, writing, or otherwise storing sign bits (e.g., copies of the sign bit of the partial width data) to the remaining width of the destination register, at block 437. In some embodiments, in a second mode 438, this may optionally include writing all zeroes to all of the remaining width of the destination register, at block 439. In another embodiment, either of these first and second modes may be replaced by a mode in which a merging or merged partial width load mode, or some other type of partial width load mode, is used.

The aforementioned method has been described in a relatively basic form, although operations may optionally be added to and/or removed from the method. For example, as mentioned determining the partial width load mode is optional (e.g., instead it may be imposed). As another example, additional operations may optionally be added, such as, for example, to decode the instruction, fetch the instruction, transmit bits on a bus, receive bits from a bus, etc. As another example, operations associated with using the result in the destination register may optionally be added to the method. For example, a zero extended partial width load result in the destination register may be used to access memory as a zero extended 32-bit memory address by a 64-bit processor otherwise operating in a 64-bit processing mode. As another example, a zero extended partial width load result in the destination register may be used to access memory as a zero extended 64-bit (or other relatively shorter width) memory address by a 128-bit (or other relatively wider width) processor otherwise operating in a 128-bit (or other relatively wider width) processing mode. In addition, while the flow diagrams show a particular order of the operations according to example embodiments, that particular order is exemplary. Alternate embodiments may optionally perform the operations in different order, combine certain operations, overlap certain operations, etc. For example, the operations at blocks 434 and 435 may be performed concurrently or in parallel instead of in series.

The mode dependent partial width load instructions and partial width load modes disclosed herein are general-purpose and may be used for various different purposes. For example, they may be used to provide different types of partial width load operations for a same opcode. However, to further illustrate certain concepts, a particular example of utilizing the mode dependent partial width load instructions and partial width load modes for different or more efficient memory addressing will be described further below. In some embodiments, relatively smaller memory addresses or pointers may be used in relatively larger address spaces. As one example, 64-bit long zero extended 32-bit pointers may be used in 64-bit architecture processors and/or 64-bit address spaces. As another example, 128-bit long zero extended 64-bit pointers may be used in 128-bit architecture processors and/or 128-bit address spaces.

Most modern general-purpose processors have either 32-bit architectures or 64-bit architectures. In the future it is likely that 128-bit architecture processors may become popular. Various special-purpose processors may use either 32-bit or 64-bit architectures, or architectures of various other widths such as 8-bit, 9-bit, 12-bit, 18-bit, 24-bit, 36-bit, 39-bit, 40-bit, 48-bit, or 60-bit. These bit widths generally refer to the bit-width of various attributes within the architecture of the processors. For example, these bit-widths may refer to supported memory address sizes, integer sizes, integer register sizes, or the like, or combinations thereof. For example, a 64-bit architecture processor may support 64-bit integer format, may have 64-bit integer general-purpose registers, may support 64-bit memory addresses to be used to access memory, etc. Some processors do not use the same bit width for all such parameters. The 64-bit width is sometimes referred to as the "word" size of the processor. That is, a 64-bit architecture processor may use 64-bit "words," a 32-bit architecture processor may use 32-bit "words," and so on.

64-bit architecture processors may tend to have certain enhanced features or advantages over 32-bit architecture processors. For example, in some embodiments, the 64-bit processor may have a larger number of processor registers, greater general-purpose processing capabilities, or have various other mechanisms or features to help improve performance, etc. However, often some aspects of 64-bit architecture operation may involve relatively higher overhead than 32-bit architecture operation. One such potential aspect may involve the use of 64-bit memory addresses or pointers. As mentioned above, in some cases, a 64-bit architecture processor may conventionally use 64-bit memory addresses or pointers to access memory. Such 64-bit memory addresses or pointers generally allow accessing data from anywhere in memory. Successive or sequential 64-bit memory address values may designate corresponding successive units of memory. These units may represent units of address resolution (e.g., word, byte, etc.).

However, many user-level application modules or other software modules do not need to use 64-bit memory pointers and/or do not need to access data from anywhere in memory frequently enough to justify the additional overhead associated with using the 64-bit memory pointers. For example, this may often be the case when an entire user-level application module or other software module is able to fit within a limited contiguous range of the memory. As a specific example, many commonly used user-level software modules and other modules are able to be contained within four gigabytes of memory. 32-bit memory addresses are sufficient to address anywhere in the contiguous four gigabytes of memory. Using smaller 32-bit memory addresses may be more efficient and/or effective than using larger 64-bit memory addresses when the software module (e.g., the code and data to be accessed most frequently) fits within the four gigabytes addressable by the 32-bit memory addresses or pointers. Advantageously, using the smaller 32-bit memory addresses in the 64-bit architecture processor may help to take advantage of the enhanced features generally associated with the 64-bit architecture, while selectively helping to reduce the unneeded or unnecessary overhead associated with using 64-bit memory addresses and/or using the larger memory footprint when appropriate (e.g., when a software module fits within four gigabytes).

Programs tend to run faster and/or use less memory when smaller pointers (e.g., 32-bit pointers) are used as compared to larger pointers (e.g., 64-bit pointers). For one thing, less memory is typically needed to store the smaller pointers. In addition, the smaller pointers generally occupy less space in caches used in processors to speed access to frequently use data. As a result, when small pointers are used, the caches may be able to hold a greater number of such smaller pointers and/or more data. In addition, the likelihood of finding data or a pointer in a cache will tend to increase more of such pointers or data are held in the cache (e.g., when smaller pointers are used), which may help to achieve increased program performance. Moreover, programs that use less data tend to allow a system to run faster. In some systems, the collection of all code and data of programs in use may not fit in memory. Portions of program may be temporarily stored on disk and brought into memory when needed (e.g., in the case of demand paging). However, when programs are smaller, such as may be the case when smaller pointers are used, they may tend to leave more room for other programs not currently running to remain in memory so that such programs do not need to be paged out to make room in the memory. Generally, system performance tends to improve when less paging happens, since such paging tends to delay program execution and may tend to delay input/output for other programs. Other potential advantages of using the 32-bit memory addresses as compared to the 64-bit memory addresses include reduced power consumption.

Figure 5:
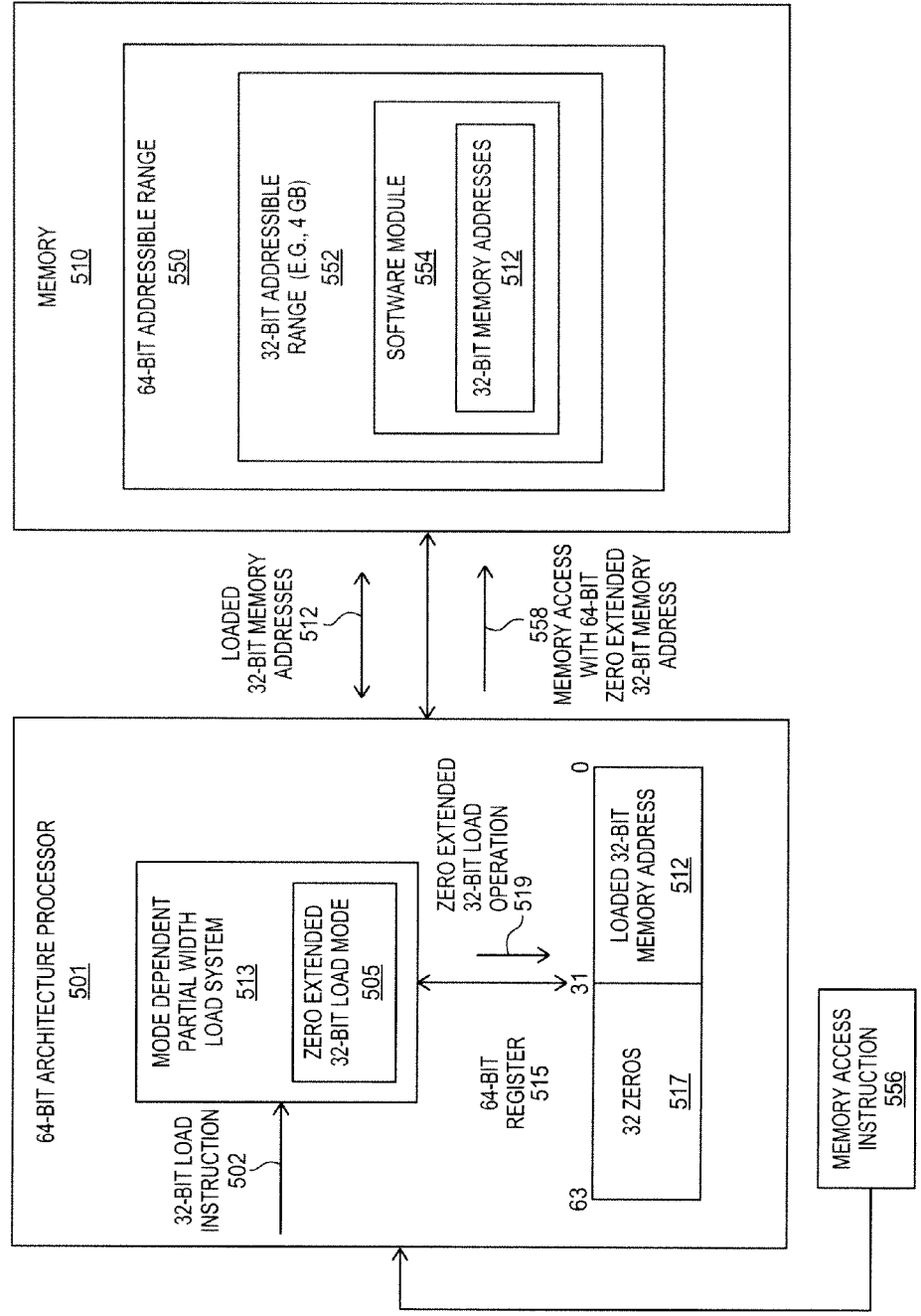
FIG. 5 is a block diagram of an embodiment of a computer system including a 64-bit architecture processor to perform zero extended 32-bit memory addressing.

FIG. 5 is a block diagram of an embodiment of a computer system 500 including a 64-bit architecture processor 501 to perform zero extended 32-bit memory addressing. The 64-bit architecture processor is coupled with a memory 510 by an interconnection mechanism 509. The memory has a 64-bit addressable range 550. The 64-bit addressable range includes, as a subset thereof, a smaller contiguous 32-bit addressable range 552. The 32-bit addressable range may have about four gigabytes. A software module 554 (e.g., a user-level application or other software) is stored within the 32-bit addressable range. The software module has 32-bit memory addresses 512.

The 64-bit processor may optionally have characteristics or features of other processors disclosed herein (e.g., the processor 101 of FIG. 1). The 64-bit architecture processor includes a mode dependent partial width load system 513. The mode dependent partial width load system may optionally have features and characteristics similar to or the same as those of the mode dependent partial width load system 113 of FIG. 1. The mode dependent partial width load system supports a zero extended 32-bit load mode 505. The processor also has a 64-bit register 515. In some embodiments, the register may be a register that may be used for memory addressing, such as a general-purpose register in some processors, or a special-purpose register used for memory addressing in other processors.

A 32-bit load instruction 502 may be provided to the mode dependent partial width load system. The 32-bit load instruction may specify or otherwise indicate one of the 32-bit memory addresses 512 (representing partial width data) as a source operand and may specify or otherwise indicate the 64-bit register 515 as a destination operand. The mode dependent partial width load system in response to the 32-bit load instruction 502 and the zero extended 32-bit load mode 505 may perform a zero extended 32-bit load operation 519 that includes storing the indicated 32-bit memory address 512 into the lowest order 32-bits of the 64-bit destination register 515 and storing zeroes in the highest order 32-bits of the 64-bit destination register 515.

Subsequently, a memory access instruction 556 may be provided to the processor. The memory access instruction may indicate the 64-bit zero extended 32-bit memory address which is a result of the 32-bit load instruction 502 and/or the operation 519. For example, the memory access instruction may indicate the destination register 515, or the result may be moved from the destination register to another register indicated by the memory access instruction. The processor, in response to the memory access instruction 556, may provide a memory access 558 (e.g., a load from memory, a write to memory, etc.) using or based on the 64-bit zero extended 32-bit memory address.

This is just one illustrative example. In other embodiments, processors having architectures other than 64-bits may optionally be used. Moreover, in other embodiments, memory addresses having sizes other than 32-bits may optionally be used. For example, in some embodiments, 128-bit zero extended 64-bit memory addresses may be used on a 128-bit architecture processor and/or 128-bit address space or addressing mode. As another example, 64-bit zero extended 16-bit or 48-bit pointers may optionally be used on a 64-bit architecture processor or 64-bit address space. In general, zero extended smaller pointers or memory addresses may be used on a larger architecture processor or address space.

User-level application modules or other unprivileged software modules generally need to have a way to change the partial width load mode when appropriate to do so (e.g., when they intend to use a different mode than the currently existing mode). This may be done in different ways. In some embodiments, the partial width load mode may be directly changeable by the user-level or unprivileged software modules. In other embodiments, the user-level or unprivileged software modules may not be able to change the partial width load mode directly. Rather, in some embodiments, the changing of the partial width load mode may be reserved for privileged software modules (e.g., an operating system module, a virtual machine monitor module, etc.). In such embodiments, the privileged software modules may provide an interface (e.g., a service, interface, etc.) to allow the user-level or unprivileged software modules to request that privileged software modules change the partial width load mode.

Figure 6:
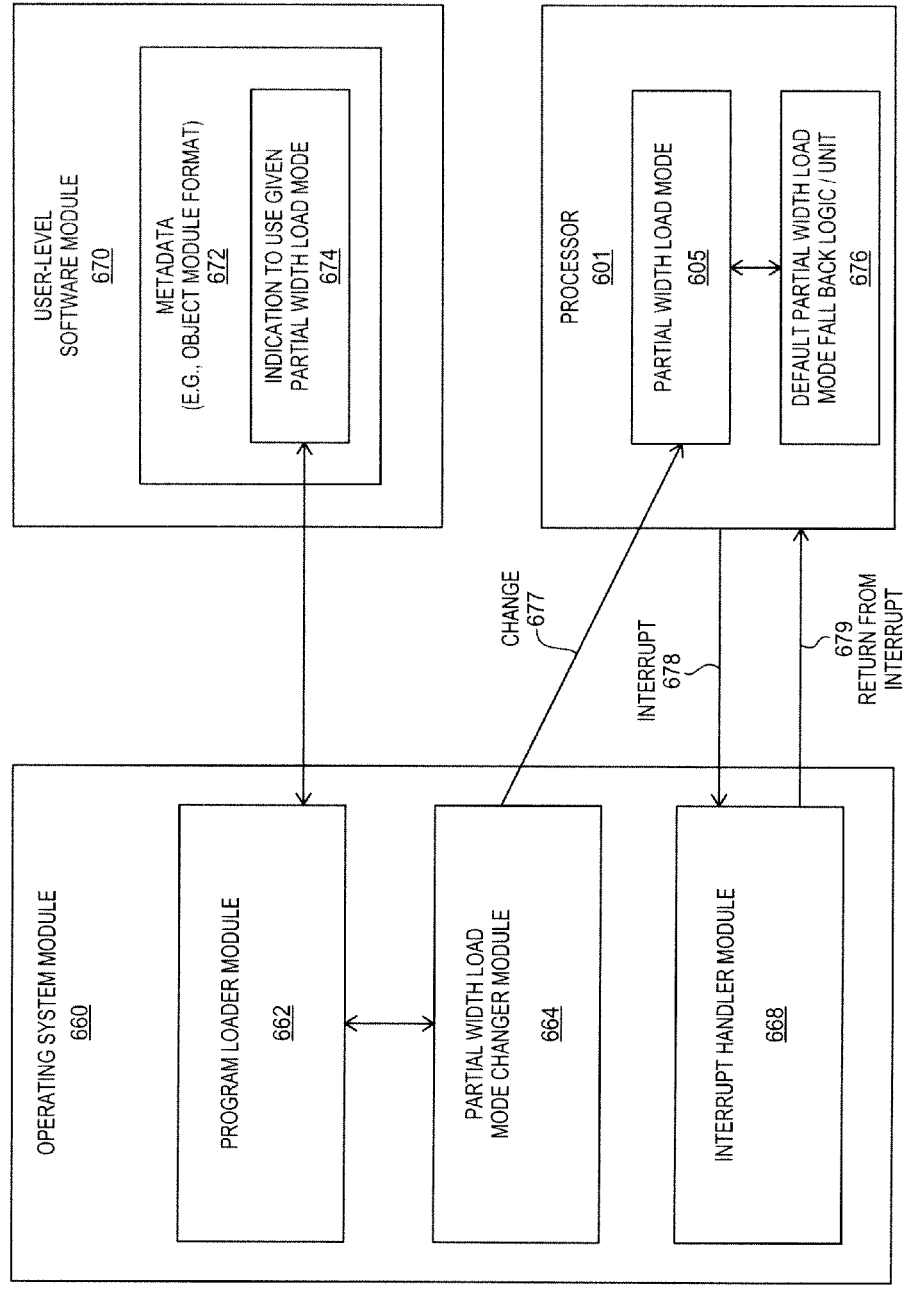
FIG. 6 is a block diagram of an embodiment of interaction between a user-level software module and an operating system module to change a partial width load mode.

FIG. 6 is a block diagram illustrating an embodiment of interaction between a user-level software module 670 (or other unprivileged software module) and an operating system module 660 (or other privileged software module) to change a partial width load mode. The user level software module includes metadata 672 including an indication 674 to use a given partial width load mode. The given partial width load mode may be the one that the software modules desires or intends to use. As one example, the metadata may include an object module format or other data structure used by the user-level software module to communication information about itself to the operating system module 660. For example, the metadata module may include a flag or one or more bits to indicate the desired partial width load mode. The operating system module includes a program loader module 662. The program loader module and/or the operating system module may be operable to examine the metadata including to examine the indication 674. The operating system module may include a partial width load mode changer module 664 that may be operable to change a partial width load mode 605 of the processor to the indicated partial width load mode 674. For example, the partial width load mode may be changed in a configuration or control register of the processor.

In some embodiments, the processor may have an instruction set that includes an instruction to change the partial width load mode. In this example, the instruction would be a privileged level instruction reserved for operating system modules or similar privileged-level software modules, although in other embodiments the instruction may be a user-level instruction capable of being utilized by user-level software modules. The instruction may be used by the partial width load mode changer module 664 when the partial width load mode is to be changed. The instruction may be decoded and executed or otherwise performed by the processor to change the mode from a starting mode to another different mode. In some embodiments, after such a mode change, a jump may optionally be performed to cause instructions to be fetched and decoded under the updated different mode, instead of using the instructions already in the pipeline which have been decoded under the outdated mode that existed prior to the performance of the instruction. In some embodiments, the instruction set may also have an instruction to read the partial width load mode. This instruction may either be a user-level instruction capable of being utilized by user-level software modules or a privileged level instruction reserved for operating system modules or similar privileged-level software modules. The instruction may be decoded and upon execution or otherwise being performed may read the partial width load mode (e.g., read one or more bits in a register). By way of example, user-level code modules or other software modules may use such an instruction to learn of the partial width load mode.

The possible use of one partial width load mode to support 32-bit addressing on a 64-bit processor was discussed above. Operating system modules, interrupt handler modules, and potentially other software may primarily use 64-bit memory addressing instead of a zero extended 32-bit memory addressing. As a result, the operating system modules, interrupt handler modules, and the like, may not need to use a partial width load mode that provides a zero extended 32-bit load, but rather may use a partial width load mode that provides an alternate type of 32-bit load for the same instruction or opcode, such as, for example, a sign extended 32-bit load or a merging 32-bit load. As shown, in some embodiments, the processor may include a default partial width load mode fallback logic or unit 676 to cause or result in an automatic fallback to a default partial width load mode under certain conditions. Examples of such conditions may include a switch or transition from executing user-level code to operating system code, after detecting or when reporting an interrupt 678 to an interrupt handler module 668, upon start of interrupt handling by the interrupt handler module, or the like. The unit or logic may be implemented in hardware or hardware potentially combined with some firmware and/or possibly some software. In the default partial width load mode, the instruction or opcode may be treated as a sign extended 32-bit load or a merging 32-bit load, for example, instead of as the zero extended 32-bit load. In some embodiments, the default partial width load mode fallback logic or unit may also cause the partial width load mode to be automatically restored from the default partial width load mode back to the partial width load mode that existed prior to the switch to the operating system code or the interrupt handling (e.g., after a return form an interrupt 679). The return instruction may read the partial width load mode upon the return to determine how to decode partial width load instructions.

Figure 7:
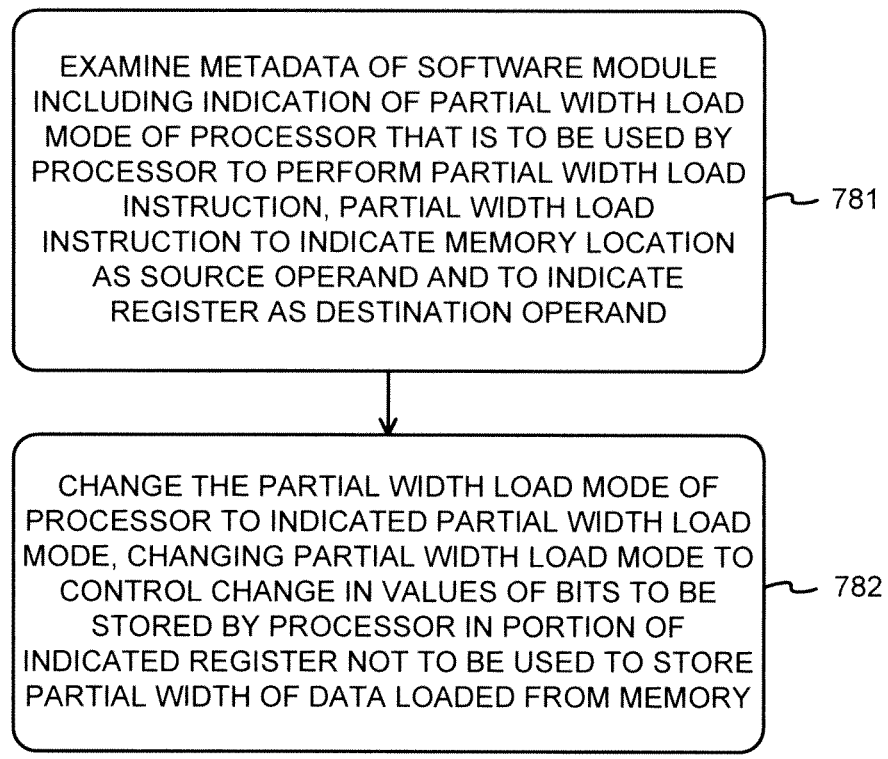
FIG. 7 is a block diagram of an embodiment of a method that may be performed by an operating system module, privileged module, or other system level module.

FIG. 7 is a block diagram of an embodiment of a method 780 that may be performed by an operating system module, privileged module, or other system level module. The method includes examining metadata of a software module at block 781. This includes examining an indication of a partial width load mode of a processor that is to be used by the processor to perform a partial width load instruction. The partial width load instruction is to indicate a memory location as a source operand and to indicate a register as a destination operand.

The method includes changing the partial width load mode of the processor to the indicated partial width load mode, at block 782. In some embodiments, changing the partial width load mode may be operable to control a change in the values of bits to be stored by the processor in a portion of the indicated register that is not to be used to store a partial width of data loaded from memory. In some embodiments, the operating system module or other system level module may maintain a set of metadata to record or track which programs use which partial width load mode. Some programs may use one partial width load mode when executing a partial width load instruction (e.g. a given opcode) whereas other programs may use another different partial width load mode when executing that partial width load instruction (e.g., that same given opcode). The operating system module or other module may access the metadata when switching between programs and/or when returning from interrupts to determine which partial width load mode to place the processor in that is appropriate for the program. By way of example, in some embodiments, the operating system may use an instruction to change the mode when switching to a program that desires to use a different mode. By way of example, in some embodiments, the operating system may use a different instruction to read the current mode to know whether or not the mode needs to be changed when switching programs.

In some embodiments, a user-level application module or other unprivileged software module may include a debug information module or other metadata module to communicate to a debugger module which partial width load mode the software module desires or intends to use. The debugger module may access and examine this debug information module or other metadata module to determine the partial width load mode to be used by the software. This may allow the debugger module to correctly interpret how the instructions will be processed by the processor.

For simplicity of description, two different modes and/or meanings of the opcode are often described herein. However, it is to be appreciated that other embodiments may use three, four, or more different modes and/or meanings for a given opcode. By way of example, a processor may have two or more bits to indicate which of multiple such different meanings should be used for a given opcode.

Different interpretations of partial width load instructions have been emphasized herein. In other embodiments, another type of instruction besides a partial width load instruction may be interpreted as a partial width load instruction (e.g., a zero extended partial width load instruction) in another mode.
Exemplary Core Architectures, Processors, and Computer Architectures Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures.
Exemplary Core Architectures
In-Order and Out-of-Order Core Block Diagram FIG. 8A is a block diagram illustrating both an exemplary in-order pipeline and an exemplary register renaming, out-of-order issue/execution pipeline according to embodiments of the invention. FIG. 8B is a block diagram illustrating both an exemplary embodiment of an in-order architecture core and an exemplary register renaming, out-of-order issue/execution architecture core to be included in a processor according to embodiments of the invention. The solid lined boxes in FIGS. 8A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 8A, a processor pipeline 800 includes a fetch stage 802, a length decode stage 804, a decode stage 806, an allocation stage 808, a renaming stage 810, a scheduling (also known as a dispatch or issue) stage 812, a register read/memory read stage 814, an execute stage 816, a write back/memory write stage 818, an exception handling stage 822, and a commit stage 824.

FIG. 8B shows processor core 890 including a front end unit 830 coupled to an execution engine unit 850, and both are coupled to a memory unit 870. The core 890 may be a reduced instruction set computing (RISC) core, a complex instruction set computing (CISC) core, a very long instruction word (VLIW) core, or a hybrid or alternative core type. As yet another option, the core 890 may be a special-purpose core, such as, for example, a network or communication core, compression engine, coprocessor core, general purpose computing graphics processing unit (GPGPU) core, graphics core, or the like.

The front end unit 830 includes a branch prediction unit 832 coupled to an instruction cache unit 834, which is coupled to an instruction translation lookaside buffer (TLB) 836, which is coupled to an instruction fetch unit 838, which is coupled to a decode unit 840. The decode unit 840 (or decoder) may decode instructions, and generate as an output one or more micro-operations, micro-code entry points, microinstructions, other instructions, or other control signals, which are decoded from, or which otherwise reflect, or are derived from, the original instructions. The decode unit 840 may be implemented using various different mechanisms. Examples of suitable mechanisms include, but are not limited to, look-up tables, hardware implementations, programmable logic arrays (PLAs), microcode read only memories (ROMs), etc. In one embodiment, the core 890 includes a microcode ROM or other medium that stores microcode for certain macroinstructions (e.g., in decode unit 840 or otherwise within the front end unit 830). The decode unit 840 is coupled to a rename/allocator unit 852 in the execution engine unit 850.

The execution engine unit 850 includes the rename/allocator unit 852 coupled to a retirement unit 854 and a set of one or more scheduler unit(s) 856. The scheduler unit(s) 856 represents any number of different schedulers, including reservations stations, central instruction window, etc. The scheduler unit(s) 856 is coupled to the physical register file(s) unit(s) 858. Each of the physical register file(s) units 858 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 858 comprises a vector registers unit, a write mask registers unit, and a scalar registers unit. These register units may provide architectural vector registers, vector mask registers, and general purpose registers. The physical register file(s) unit(s) 858 is overlapped by the retirement unit 854 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 854 and the physical register file(s) unit(s) 858 are coupled to the execution cluster(s) 860. The execution cluster(s) 860 includes a set of one or more execution units 862 and a set of one or more memory access units 864. The execution units 862 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 856, physical register file(s) unit(s) 858, and execution cluster(s) 860 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 864). It should also be understood that where separate pipelines are used, one or more of these pipelines may be out-of-order issue/execution and the rest in-order.

The set of memory access units 864 is coupled to the memory unit 870, which includes a data TLB unit 872 coupled to a data cache unit 874 coupled to a level 2 (L2) cache unit 876. In one exemplary embodiment, the memory access units 864 may include a load unit, a store address unit, and a store data unit, each of which is coupled to the data TLB unit 872 in the memory unit 870. The instruction cache unit 834 is further coupled to a level 2 (L2) cache unit 876 in the memory unit 870. The L2 cache unit 876 is coupled to one or more other levels of cache and eventually to a main memory.

By way of example, the exemplary register renaming, out-of-order issue/execution core architecture may implement the pipeline 800 as follows: 1) the instruction fetch 838 performs the fetch and length decoding stages 802 and 804; 2) the decode unit 840 performs the decode stage 806; 3) the rename/allocator unit 852 performs the allocation stage 808 and renaming stage 810; 4) the scheduler unit(s) 856 performs the schedule stage 812; 5) the physical register file(s) unit(s) 858 and the memory unit 870 perform the register read/memory read stage 814; the execution cluster 860 perform the execute stage 816; 6) the memory unit 870 and the physical register file(s) unit(s) 858 perform the write back/ memory write stage 818; 7) various units may be involved in the exception handling stage 822; and 8) the retirement unit 854 and the physical register file(s) unit(s) 858 perform the commit stage 824.

The core 890 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 890 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 834/874 and a shared L2 cache unit 876, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Specific Exemplary In-Order Core Architecture

Figure 9B:
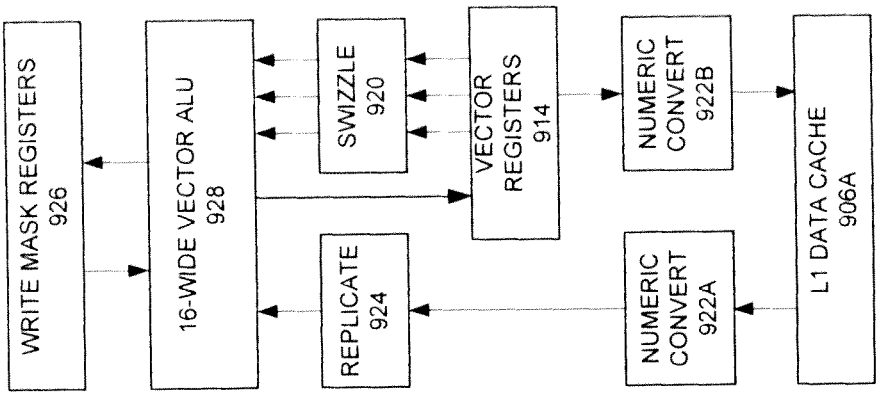
FIG. 9B is an expanded view of part of the processor core in FIG. 9A according to embodiments of the invention.
Figure 9A:
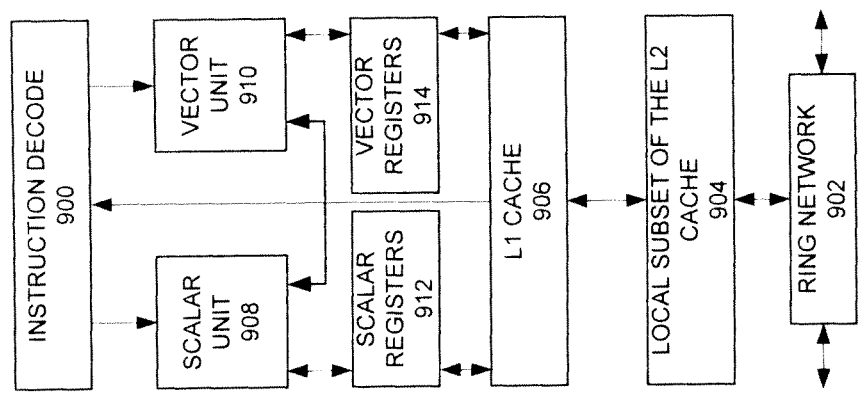
FIG. 9A is a block diagram of a single processor core, along with its connection to the on-die interconnect network and with its local subset of the Level 2 (L2) cache, according to embodiments of the invention.

FIGS. 9A-B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 9A is a block diagram of a single processor core, along with its connection to the on-die interconnect network 902 and with its local subset of the Level 2 (L2) cache 904, according to embodiments of the invention. In one embodiment, an instruction decoder 900 supports the x86 instruction set with a packed data instruction set extension. An L1 cache 906 allows low-latency accesses to cache memory into the scalar and vector units. While in one embodiment (to simplify the design), a scalar unit 908 and a vector unit 910 use separate register sets (respectively, scalar registers 912 and vector registers 914) and data transferred between them is written to memory and then read back in from a level 1 (L1) cache 906, alternative embodiments of the invention may use a different approach (e.g., use a single register set or include a communication path that allow data to be transferred between the two register files without being written and read back).

The local subset of the L2 cache 904 is part of a global L2 cache that is divided into separate local subsets, one per processor core. Each processor core has a direct access path to its own local subset of the L2 cache 904. Data read by a processor core is stored in its L2 cache subset 904 and can be accessed quickly, in parallel with other processor cores accessing their own local L2 cache subsets. Data written by a processor core is stored in its own L2 cache subset 904 and is flushed from other subsets, if necessary. The ring network ensures coherency for shared data. The ring network is bi-directional to allow agents such as processor cores, L2 caches and other logic blocks to communicate with each other within the chip. Each ring data-path is 1012-bits wide per direction.

FIG. 9B is an expanded view of part of the processor core in FIG. 9A according to embodiments of the invention. FIG. 9B includes an L1 data cache 906A part of the L1 cache 904, as well as more detail regarding the vector unit 910 and the vector registers 914. Specifically, the vector unit 910 is a 16-wide vector processing unit (VPU) (see the 16-wide ALU 928), which executes one or more of integer, single-precision float, and double-precision float instructions. The VPU supports swizzling the register inputs with swizzle unit 920, numeric conversion with numeric convert units 922A-B, and replication with replication unit 924 on the memory input. Write mask registers 926 allow predicating resulting vector writes.

Processor with Integrated Memory Controller and Graphics

Figure 10:
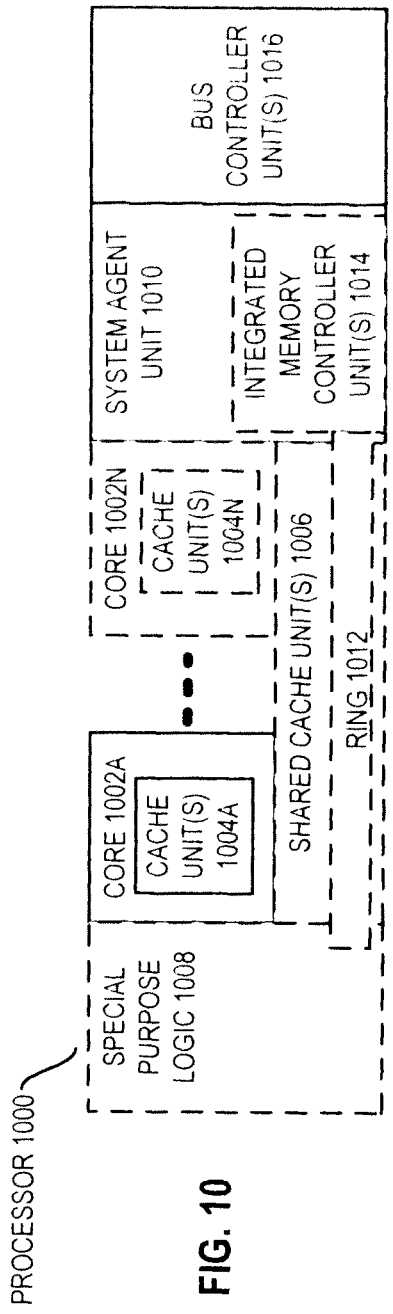
FIG. 10 is a block diagram of a processor that may have more than one core, may have an integrated memory controller, and may have integrated graphics according to embodiments of the invention.

FIG. 10 is a block diagram of a processor 1000 that may have more than one core, may have an integrated memory controller, and may have integrated graphics according to embodiments of the invention. The solid lined boxes in FIG. 10 illustrate a processor 1000 with a single core 1002A, a system agent 1010, a set of one or more bus controller units 1016, while the optional addition of the dashed lined boxes illustrates an alternative processor 1000 with multiple cores 1002A-N, a set of one or more integrated memory controller unit(s) 1014 in the system agent unit 1010, and special purpose logic 1008.

Thus, different implementations of the processor 1000 may include: 1) a CPU with the special purpose logic 1008 being integrated graphics and/or scientific (throughput) logic (which may include one or more cores), and the cores 1002A-N being one or more general purpose cores (e.g., general purpose in-order cores, general purpose out-of-order cores, a combination of the two); 2) a coprocessor with the cores 1002A-N being a large number of special purpose cores intended primarily for graphics and/or scientific (throughput); and 3) a coprocessor with the cores 1002A-N being a large number of general purpose in-order cores. Thus, the processor 1000 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 1000 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache units 1006, and external memory (not shown) coupled to the set of integrated memory controller units 1014. The set of shared cache units 1006 may include one or more mid-level caches, such as level 2 (L2), level 3 (L3), level 4 (L4), or other levels of cache, a last level cache (LLC), and/or combinations thereof. While in one embodiment a ring based interconnect unit 1012 interconnects the integrated graphics logic 1008, the set of shared cache units 1006, and the system agent unit 1010/integrated memory controller unit(s) 1014, alternative embodiments may use any number of well-known techniques for interconnecting such units. In one embodiment, coherency is maintained between one or more cache units 1006 and cores 1002-A-N.

In some embodiments, one or more of the cores 1002A-N are capable of multi-threading. The system agent 1010 includes those components coordinating and operating cores 1002A-N. The system agent unit 1010 may include for example a power control unit (PCU) and a display unit. The PCU may be or include logic and components needed for regulating the power state of the cores 1002A-N and the integrated graphics logic 1008. The display unit is for driving one or more externally connected displays.

The cores 1002A-N may be homogenous or heterogeneous in terms of architecture instruction set; that is, two or more of the cores 1002A-N may be capable of execution the same instruction set, while others may be capable of executing only a subset of that instruction set or a different instruction set.

Exemplary Computer Architectures

FIGS. 11-14 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 11:
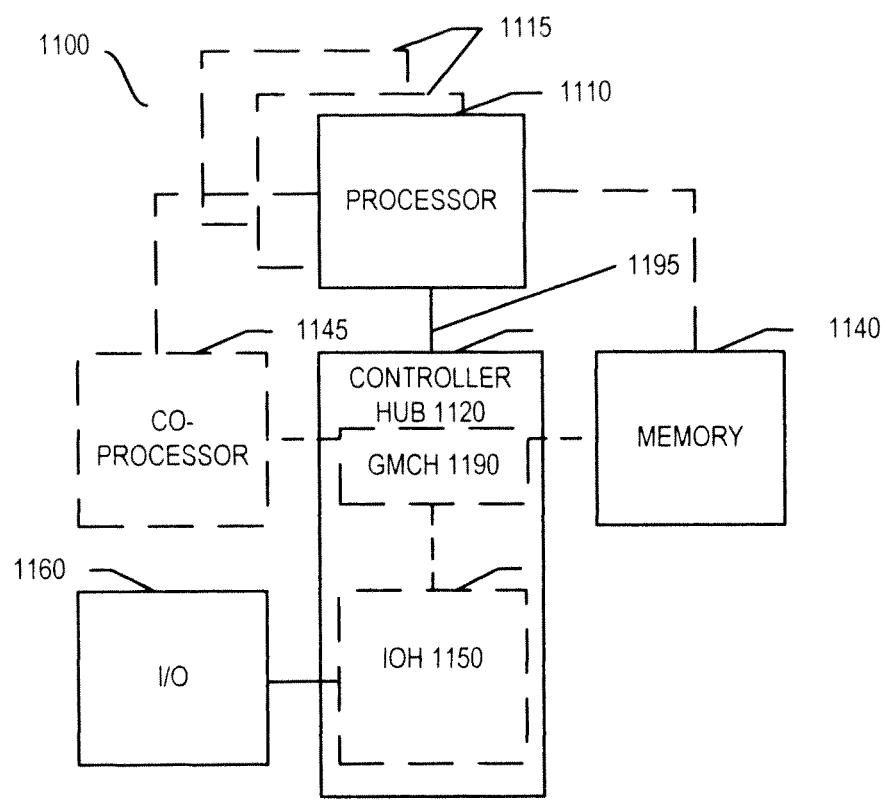
FIG. 11 shown is a block diagram of a system in accordance with one embodiment of the present invention.

Referring now to FIG. 11, shown is a block diagram of a system 1100 in accordance with one embodiment of the present invention. The system 1100 may include one or more processors 1110, 1115, which are coupled to a controller hub 1120. In one embodiment the controller hub 1120 includes a graphics memory controller hub (GMCH) 1190 and an Input/Output Hub (IOH) 1150 (which may be on separate chips); the GMCH 1190 includes memory and graphics controllers to which are coupled memory 1140 and a coprocessor 1145; the IOH 1150 is couples input/output (I/O) devices 1160 to the GMCH 1190. Alternatively, one or both of the memory and graphics controllers are integrated within the processor (as described herein), the memory 1140 and the coprocessor 1145 are coupled directly to the processor 1110, and the controller hub 1120 in a single chip with the IOH 1150.

The optional nature of additional processors 1115 is denoted in FIG. 11 with broken lines. Each processor 1110, 1115 may include one or more of the processing cores described herein and may be some version of the processor 1000.

The memory 1140 may be, for example, dynamic random access memory (DRAM), phase change memory (PCM), or a combination of the two. For at least one embodiment, the controller hub 1120 communicates with the processor(s) 1110, 1115 via a multi-drop bus, such as a frontside bus (FSB), point-to-point interface such as QuickPath Interconnect (QPI), or similar connection 1195.

In one embodiment, the coprocessor 1145 is a special-purpose processor, such as, for example, a high-throughput MIC processor, a network or communication processor, compression engine, graphics processor, GPGPU, embedded processor, or the like. In one embodiment, controller hub 1120 may include an integrated graphics accelerator.

There can be a variety of differences between the physical resources 1110, 1115 in terms of a spectrum of metrics of merit including architectural, microarchitectural, thermal, power consumption characteristics, and the like.

In one embodiment, the processor 1110 executes instructions that control data processing operations of a general type. Embedded within the instructions may be coprocessor instructions. The processor 1110 recognizes these coprocessor instructions as being of a type that should be executed by the attached coprocessor 1145. Accordingly, the processor 1110 issues these coprocessor instructions (or control signals representing coprocessor instructions) on a coprocessor bus or other interconnect, to coprocessor 1145. Coprocessor(s) 1145 accept and execute the received coprocessor instructions.

Figure 12:
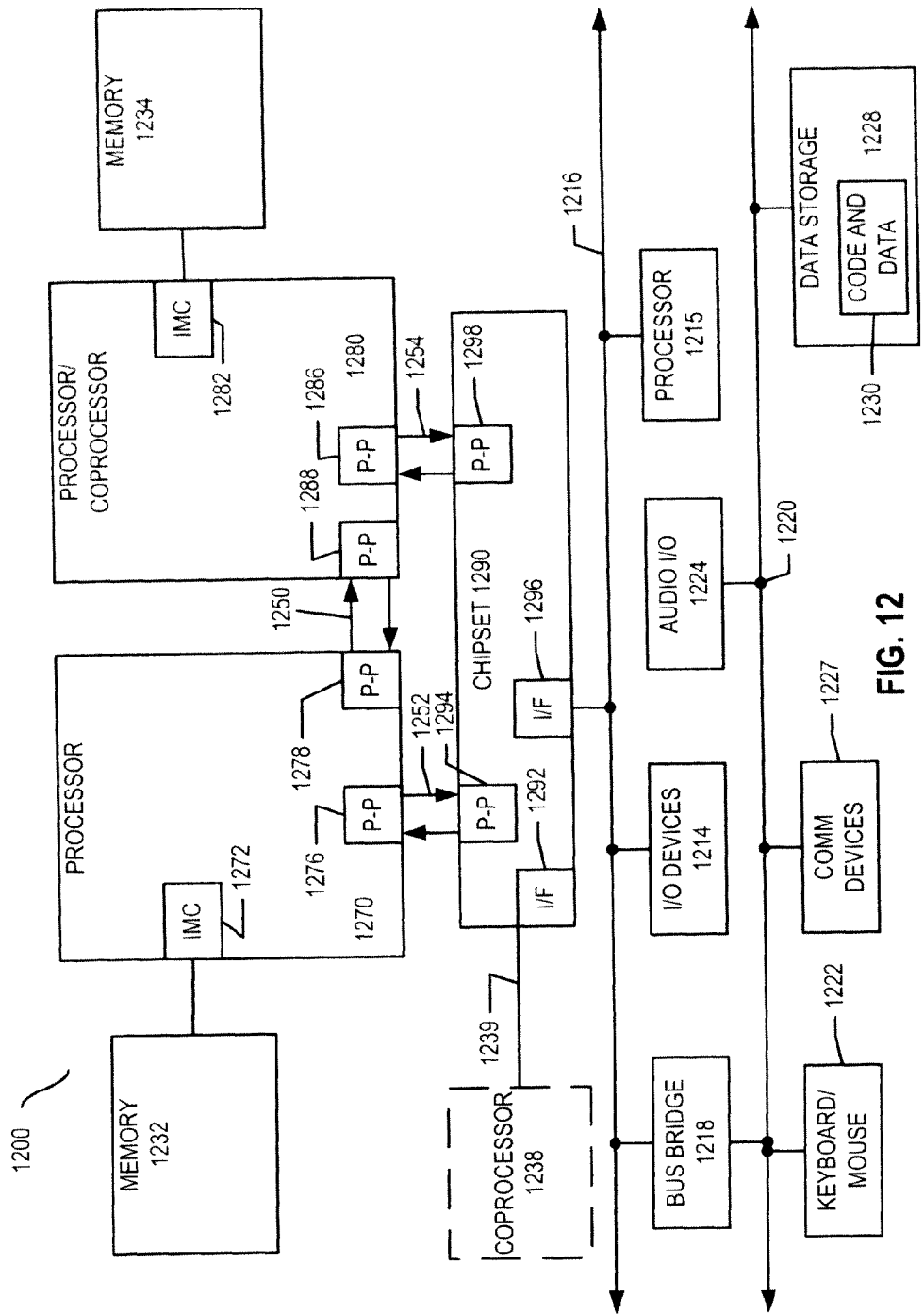
FIG. 12 shown is a block diagram of a first more specific exemplary system in accordance with an embodiment of the present invention.

Referring now to FIG. 12, shown is a block diagram of a first more specific exemplary system 1200 in accordance with an embodiment of the present invention. As shown in FIG. 12, multiprocessor system 1200 is a point-to-point interconnect system, and includes a first processor 1270 and a second processor 1280 coupled via a point-to-point interconnect 1250. Each of processors 1270 and 1280 may be some version of the processor 1000. In one embodiment of the invention, processors 1270 and 1280 are respectively processors 1110 and 1115, while coprocessor 1238 is coprocessor 1145. In another embodiment, processors 1270 and 1280 are respectively processor 1110 coprocessor 1145.

Processors 1270 and 1280 are shown including integrated memory controller (IMC) units 1272 and 1282, respectively. Processor 1270 also includes as part of its bus controller units point-to-point (P-P) interfaces 1276 and 1278; similarly, second processor 1280 includes P-P interfaces 1286 and 1288. Processors 1270, 1280 may exchange information via a point-to-point (P-P) interface 1250 using P-P interface circuits 1278, 1288. As shown in FIG. 12, IMCs 1272 and 1282 couple the processors to respective memories, namely a memory 1232 and a memory 1234, which may be portions of main memory locally attached to the respective processors.

Processors 1270, 1280 may each exchange information with a chipset 1290 via individual P-P interfaces 1252, 1254 using point to point interface circuits 1276, 1294, 1286, 1298. Chipset 1290 may optionally exchange information with the coprocessor 1238 via a high-performance interface 1239. In one embodiment, the coprocessor 1238 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 1290 may be coupled to a first bus 1216 via an interface 1296. In one embodiment, first bus 1216 may be a Peripheral Component Interconnect (PCI) bus, or a bus such as a PCI Express bus or another third generation I/O interconnect bus, although the scope of the present invention is not so limited.

As shown in FIG. 12, various I/O devices 1214 may be coupled to first bus 1216, along with a bus bridge 1218 which couples first bus 1216 to a second bus 1220. In one embodiment, one or more additional processor(s) 1215, such as coprocessors, high-throughput MIC processors, GPGPU's, accelerators (such as, e.g., graphics accelerators or digital signal processing (DSP) units), field programmable gate arrays, or any other processor, are coupled to first bus 1216. In one embodiment, second bus 1220 may be a low pin count (LPC) bus. Various devices may be coupled to a second bus 1220 including, for example, a keyboard and/or mouse 1222, communication devices 1227 and a storage unit 1228 such as a disk drive or other mass storage device which may include instructions/code and data 1230, in one embodiment. Further, an audio I/O 1224 may be coupled to the second bus 1220. Note that other architectures are possible. For example, instead of the point-to-point architecture of FIG. 12, a system may implement a multi-drop bus or other such architecture.

Figure 13:
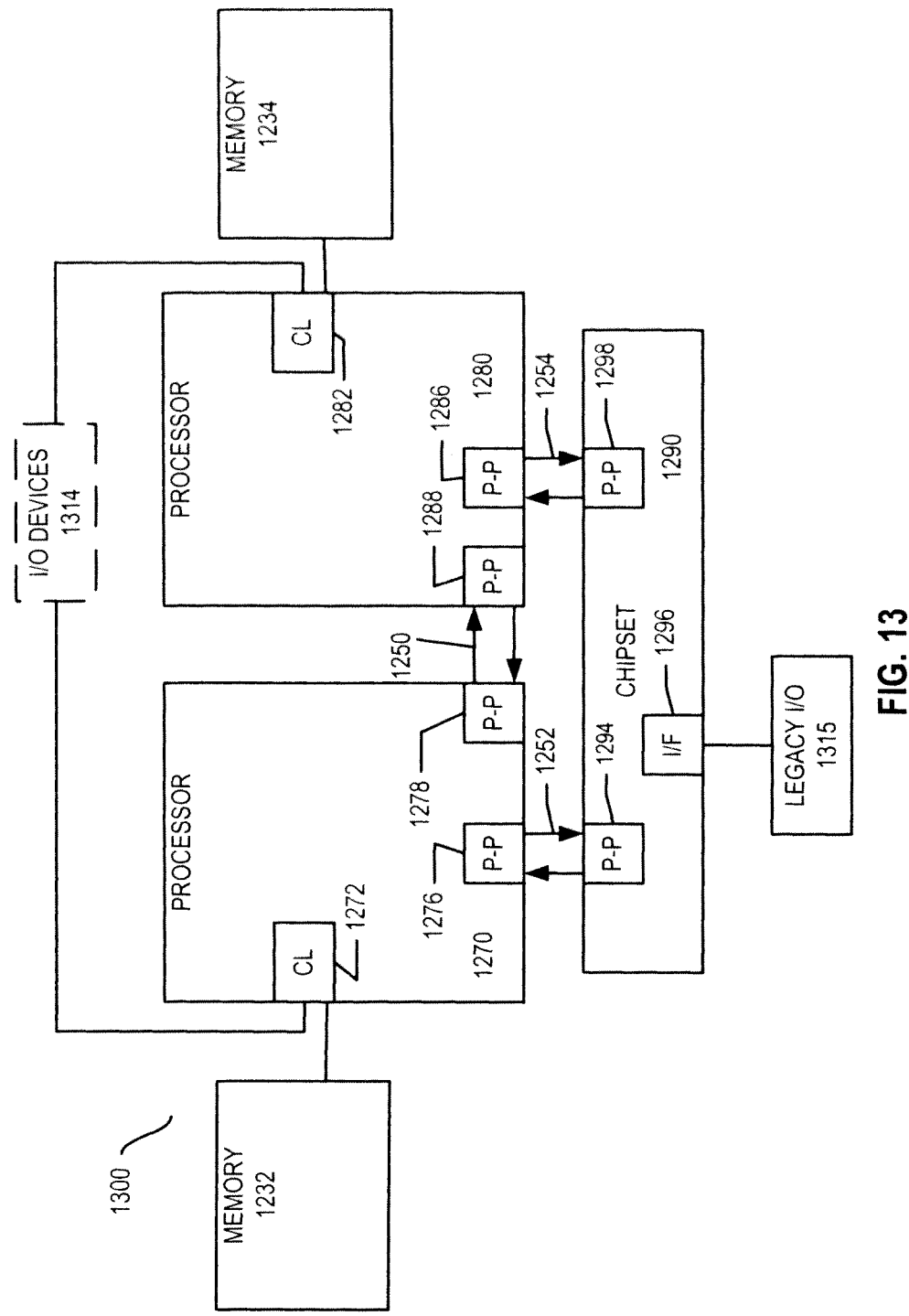
FIG. 13 shown is a block diagram of a second more specific exemplary system in accordance with an embodiment of the present invention.

Referring now to FIG. 13, shown is a block diagram of a second more specific exemplary system 1300 in accordance with an embodiment of the present invention. Like elements in FIGS. 12 and 13 bear like reference numerals, and certain aspects of FIG. 12 have been omitted from FIG. 13 in order to avoid obscuring other aspects of FIG. 13.

FIG. 13 illustrates that the processors 1270, 1280 may include integrated memory and I/O control logic ("CL") 1272 and 1282, respectively. Thus, the CL 1272, 1282 include integrated memory controller units and include I/O control logic. FIG. 13 illustrates that not only are the memories 1232, 1234 coupled to the CL 1272, 1282, but also that I/O devices 1314 are also coupled to the control logic 1272, 1282. Legacy I/O devices 1315 are coupled to the chipset 1290.

Figure 14:
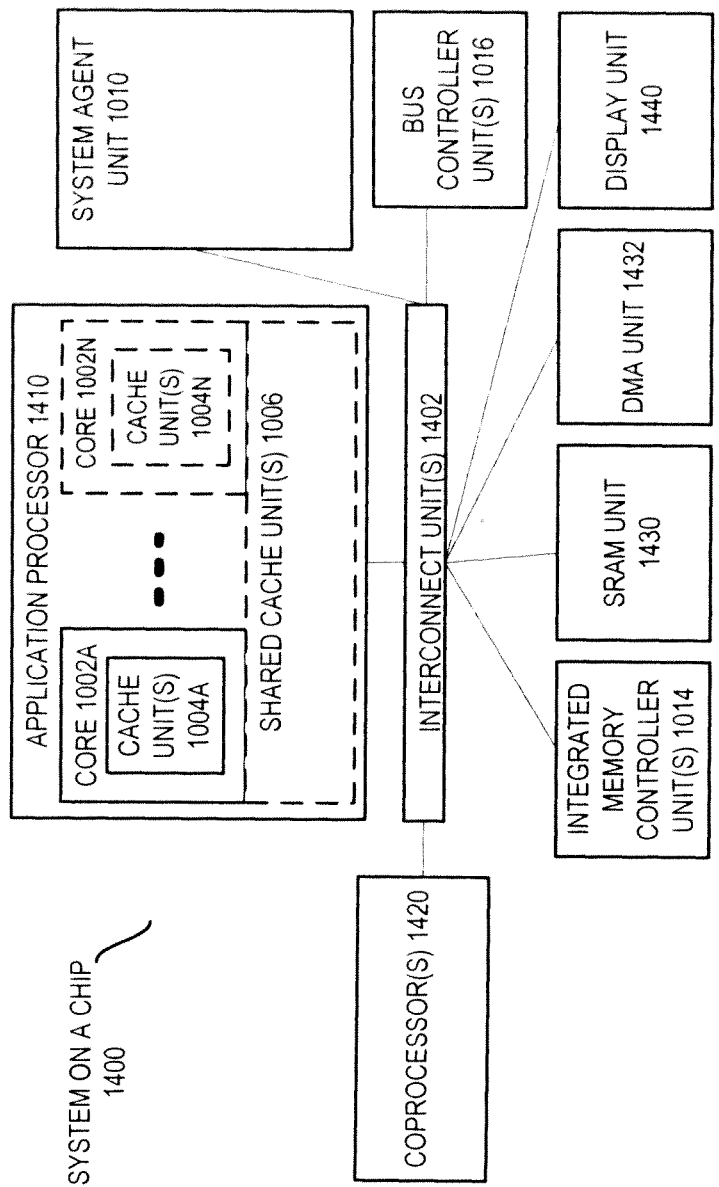
FIG. 14 shown is a block diagram of a SoC in accordance with an embodiment of the present invention.

Referring now to FIG. 14, shown is a block diagram of a SoC 1400 in accordance with an embodiment of the present invention. Similar elements in FIG. 10 bear like reference numerals. Also, dashed lined boxes are optional features on more advanced SoCs. In FIG. 14, an interconnect unit(s) 1402 is coupled to: an application processor 1410 which includes a set of one or more cores 202A-N and shared cache unit(s) 1006; a system agent unit 1010; a bus controller unit(s) 1016; an integrated memory controller unit(s) 1014; a set or one or more coprocessors 1420 which may include integrated graphics logic, an image processor, an audio processor, and a video processor; an static random access memory (SRAM) unit 1430; a direct memory access (DMA) unit 1432; and a display unit 1440 for coupling to one or more external displays. In one embodiment, the coprocessor(s) 1420 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 1230 illustrated in FIG. 12, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

Emulation (Including Binary Translation, Code Morphing, Etc.)

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

FIG. 15 is a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 15 shows a program in a high level language 1502 may be compiled using an x86 compiler 1504 to generate x86 binary code 1506 that may be natively executed by a processor with at least one x86 instruction set core 1516. The processor with at least one x86 instruction set core 1516 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 1504 represents a compiler that is operable to generate x86 binary code 1506 (e.g., object code) that can, with or without additional linkage processing, be executed on the processor with at least one x86 instruction set core 1516. Similarly, FIG. 15 shows the program in the high level language 1502 may be compiled using an alternative instruction set compiler 1508 to generate alternative instruction set binary code 1510 that may be natively executed by a processor without at least one x86 instruction set core 1514 (e.g., a processor with cores that execute the MIPS instruction set of MIPS Technologies of Sunnyvale, Calif. and/or that execute the ARM instruction set of ARM Holdings of Sunnyvale, Calif.). The instruction converter 1512 is used to convert the x86 binary code 1506 into code that may be natively executed by the processor without an x86 instruction set core 1514. This converted code is not likely to be the same as the alternative instruction set binary code 1510 because an instruction converter capable of this is difficult to make; however, the converted code will accomplish the general operation and be made up of instructions from the alternative instruction set. Thus, the instruction converter 1512 represents software, firmware, hardware, or a combination thereof that, through emulation, simulation or any other process, allows a processor or other electronic device that does not have an x86 instruction set processor or core to execute the x86 binary code 1506.

Components, features, and details described for any of FIGS. 2-3 and 5 may also optionally be used in any of FIGS. 1 and 4. Moreover, components, features, and details described herein for any of the apparatus may also optionally be used in any of the methods described herein, which in embodiments may be performed by and/or with such the apparatus.

In the description and claims, the terms "coupled" and "connected," along with their derivatives, may have been used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other. For example, a memory subsystem may be coupled with a decoder through one or more intervening units or logic, or register write unit may be coupled with a register through one or more intervening units or logic. In the figures, bidirectional arrows are used to show bidirectional connections and couplings.

In the description and claims, the term "logic" may have been used. As used herein, logic may include hardware, firmware, software, or a combination thereof. Examples of logic include integrated circuitry, application specific integrated circuits, analog circuits, digital circuits, programmed logic devices, memory devices including instructions, etc. In some embodiments, the hardware logic may include transistors and/or gates potentially along with other circuitry components. The logic may represent a module, component, unit, processor element, etc.

In the description above, for purposes of explanation, numerous specific details have been set forth in order to provide a thorough understanding of embodiments of the invention. It will be apparent however, to one skilled in the art, that one or more other embodiments may be practiced without some of these specific details. The particular embodiments described are not provided to limit the invention but to illustrate it through example embodiments. The scope of the invention is not to be determined by the specific examples but only by the claims. In other instances, well-known circuits, structures, devices, and operations have been shown in block diagram form or without detail in order to avoid obscuring the understanding of the description.

Where considered appropriate, reference numerals, or terminal portions of reference numerals, have been repeated among the figures to indicate corresponding or analogous elements, which may optionally have similar or the same characteristics, unless specified or clearly apparent otherwise. Where multiple components have been described, they may generally be incorporated into a single component. In other cases, where a single component has been described, it may generally be partitioned into multiple components.

Various operations and methods have been described. Some of the methods have been described in a relatively basic form in the flow diagrams, but operations may optionally be added to and/or removed from the methods. In addition, while the flow diagrams show a particular order of the operations according to example embodiments, that particular order is exemplary. Alternate embodiments may optionally perform the operations in different order, combine certain operations, overlap certain operations, etc.

Some embodiments include an article of manufacture (e.g., a computer program product) that includes a machine-readable medium. The medium may include a mechanism that provides, for example stores, information in a form that is readable by the machine. The machine-readable medium may provide, or have stored thereon, one or more instructions, that if and/or when executed by a machine are operable to cause the machine to perform and/or result in the machine performing one or operations, methods, or techniques disclosed herein. Examples of suitable machines include, but are not limited to, processors, instruction processing apparatus, digital logic circuits, integrated circuits, and the like. Still other examples of suitable machines include computing devices and other electronic devices that incorporate such processors, instruction processing apparatus, digital logic circuits, or integrated circuits. Examples of such computing devices and electronic devices include, but are not limited to, desktop computers, laptop computers, notebook computers, tablet computers, netbooks, smartphones, cellular phones, servers, network devices (e.g., routers and switches.), Mobile Internet devices (MIDs), media players, smart televisions, nettops, set-top boxes, and video game controllers.

In some embodiments, the machine-readable medium may include a tangible and/or non-transitory machine-readable storage medium. For example, the tangible and/or non-transitory machine-readable storage medium may include a floppy diskette, an optical storage medium, an optical disk, an optical data storage device, a CD-ROM, a magnetic disk, a magneto-optical disk, a read only memory (ROM), a programmable ROM (PROM), an erasable-and-programmable ROM (EPROM), an electrically-erasable-and-programmable ROM (EEPROM), a random access memory (RAM), a static-RAM (SRAM), a dynamic-RAM (DRAM), a Flash memory, a phase-change memory, a phase-change data storage material, a non-volatile memory, a non-volatile data storage device, a non-transitory memory, a non-transitory data storage device, or the like. The non-transitory machine-readable storage medium does not consist only of a transitory propagated signal.

It should also be appreciated that reference throughout this specification to "one embodiment", "an embodiment", or "one or more embodiments", for example, means that a particular feature may be included in the practice of the invention. Similarly, it should be appreciated that in the description various features are sometimes grouped together in a single embodiment, Figure, or description thereof for the purpose of streamlining the disclosure and aiding in the understanding of various inventive aspects. This method of disclosure, however, is not to be interpreted as reflecting an intention that the invention requires more features than are expressly recited in each claim. Rather, as the following claims reflect, inventive aspects may lie in less than all features of a single disclosed embodiment. Thus, the claims following the Detailed Description are hereby expressly incorporated into this Detailed Description, with each claim standing on its own as a separate embodiment of the invention.

EXAMPLE EMBODIMENTS

The following examples pertain to further embodiments. Specifics in the examples may be used anywhere in one or more embodiments.

Example 1 is a processor including a register having a width, and a decode unit to receive a partial width load instruction. The partial width load instruction is to indicate a memory location of a memory as a source operand and is to indicate the register as a destination operand. The processor also includes a memory subsystem coupled with the decode unit. The memory subsystem, in response to the partial width load instruction, is to load data from the indicated memory location to the processor. The processor also includes a register write unit coupled with the memory subsystem and the register. The register write unit, in response to the partial width load instruction, is to write at least a portion of the loaded data to a partial width of the register, and to finish writing the register with a set of bits stored in a remaining width of the register that have bit values that depend on a partial width load mode of the processor, the partial width load instruction not to indicate the partial width load mode.

Example 2 includes the processor of Example 1 and optionally in which the register write unit, in the partial width load mode, is to write all zeros as the set of bits to the remaining width of the register, and in a second partial width load mode, is not to write all zeros as the set of bits to the remaining width of the register.

Example 3 includes the processor of Example 2 and optionally in which the register write unit, in the second partial width load mode, is to write sign extension bits as the set of bits to the remaining width of the register.

Example 4 includes the processor of Example 2 and optionally in which the register write unit, in the second partial width load mode, is to finish writing the register with a set of bits that are initially to be in the remaining width, prior to the decoder receiving the partial width load instruction, stored as the set of bits in the remaining width of the register.

Example 5 includes the processor of any preceding Example and optionally further including at least one bit to indicate the partial width load mode, in which the processor is to access the at least one bit to determine the partial width load mode and is to select a corresponding approach that determines the bit values for the set of bits.

Example 6 includes the processor of any preceding Example and optionally in which the at least one bit is in a register of the processor and is application-visible.

Example 7 includes the processor of any preceding Example and optionally in which the width of the register is at least as wide as memory addresses used by the processor to access memory, and in which the partial width of the register is only a portion of (e.g., half) a width of the register.

Example 8 includes the processor of any preceding Example and optionally in which one of the processor is a 64-bit architecture processor that uses 64-bit memory addresses, and wherein the partial width of the register is 32-bits, or the processor is a 128-bit architecture processor that uses 128-bit memory addresses, and wherein the partial width of the register is 64-bits.

Example 9 includes the processor of any preceding Example and optionally in which the processor allows a user-level application to change the partial width load mode.

Example 10 includes the processor of any preceding Example and optionally in which the processor allows at least one of an operating system and a virtual machine monitor to change the partial width load mode but does not allow user-level applications to change the partial width load mode.

Example 11 includes the processor of any preceding Example and optionally in which the processor has an instruction set that includes an instruction to change the partial width load mode.

Example 12 includes the processor of Example 1 and optionally in which the register write unit, in the partial width load mode, is to write zeros as the set of bits to the remaining width of the register, and the processor optionally further includes a unit of the processor to change the partial width load mode to a second partial width load mode at one of an interrupt and a transition from an application to an operating system.

Example 13 is a method performed by a processor. The method includes receiving a partial width load instruction. The partial width load instruction indicates a memory location of a memory as a source operand and indicates a register as a destination operand. The method includes loading data from the indicated memory location to the processor in response to the partial width load instruction. The method includes writing at least a portion of the loaded data to a partial width of the register in response to the partial width load instruction. The method includes finishing writing the register with a set of bits stored in a remaining width of the register that have bit values that depend on a partial width load mode of the processor. The partial width load instruction does not indicate the partial width load mode.

Example 14 includes the method of Example 13 and optionally in which finishing writing the register includes writing zeros as the set of bits to the remaining width of the register in the partial width load mode. Optionally, in a second, different partial width load mode, sign extension bits instead of the zeroes would be written to the remaining width of the register.

Example 15 includes the method of Example 13 and optionally in which finishing writing the register includes writing zeros as the set of bits to the remaining width of the register in the partial width load mode. Optionally, in a second, different partial width load mode, a set of bits initially in the remaining width would be stored in the remaining width of the register.

Example 16 includes the method of any preceding Example and optionally further including accessing at least one bit to determine the partial width load mode. The method may also optionally include selecting an approach corresponding to the partial width load mode that determines the bit values for the set of bits.

Example 17 includes the method of any preceding Example and optionally in which accessing the at least one bit includes accessing the at least one bit in an application-visible register of the processor.

Example 18 includes the method of any preceding Example and optionally in which writing the partial width of the register includes writing only a subset of (e.g., half) a width of the register. Optionally, the register is at least as wide as memory addresses used by the processor to access the memory.

Example 19 includes the method of any preceding Example and optionally in which writing the partial width of the register includes one of optionally writing 32-bits of the register with zeros in a remainder of the register, and wherein the memory addresses used by the processor to access the memory are 64-bits, or optionally writing 64-bits of the register with zeros in a remainder of the register, and wherein the memory addresses used by the processor to access the memory are 128-bits.

Example 20 includes the method of any preceding Example and optionally further including receiving a control signal from a user-level application to change the partial width load mode, and changing the partial width load mode after receiving the control signal.

Example 21 includes the method of any preceding Example and optionally further including receiving control signal from one of an operating system and a virtual machine monitor to change the partial width load mode, and changing the partial width load mode after receiving the control signal from said one of the operating system and the virtual machine monitor. The method may also optionally include preventing user-level applications from changing the partial width load mode.

Example 22 includes the method of any preceding Example and optionally further including changing the partial width load mode in response to a user-level instruction of an instruction set of the processor.

Example 23 is an article of manufacture including a non-transitory machine-readable storage medium storing a set of instructions that if executed by a machine are operable to cause the machine to perform operations. The operations include examining metadata of a software module including examining an indication of a partial width load mode of a processor that is to be used by the processor to perform a partial width load instruction. The partial width load instruction is to indicate a memory location as a source operand and is to indicate a register as a destination operand. The operations also include changing the partial width load mode of the processor to the indicated partial width load mode. In which changing the partial width load mode is to control a change in values of bits to be stored by the processor in a portion of the indicated register that is not to be used to store a partial width of data loaded from memory.

Example 24 includes the article of manufacture of Example 23 and optionally in which the set of instructions further comprise instructions that if executed by the machine are operable to cause the machine to perform operations including, maintaining metadata indicating which different software modules are to use which different partial width load modes including that the software module is to use the partial width load mode, and after handling an interrupt, changing the partial width load mode of the processor to the indicated partial width load mode in conjunction with a transition back to execution of code from the software module.

Example 25 is a system to process instructions including an interconnect, a dynamic random access memory (DRAM) coupled with the interconnect, and a processor coupled with the interconnect. The processor includes a register having a width, an a decode unit to receive an instruction. The instruction is to indicate a memory location of the DRAM as a source operand and is to indicate the register as a destination operand. The processor also includes a memory subsystem coupled with the decode unit. The memory subsystem, in response to the instruction, to load data from the indicated memory location. The processor also includes a unit coupled with the memory subsystem and the register. The unit, in response to the instruction, is to write at least a portion of the loaded data to a partial width of the register, and is to finish writing the register with a set of bits stored in a remaining width of the register that have bit values that depend on a mode of the processor. Optionally, the instruction does not indicate the mode.

Example 26 includes the system of Example 25 and optionally in which the unit, in the partial width load mode, is to write zeros as the set of bits to the remaining width of the register. Optionally, in a second partial width load mode, the unit is not to write zeroes as the set of bits to the remaining width of the register.

Example 27 is a processor including means for receiving a partial width load instruction. The partial width load instruction is to indicate a memory location of a memory as a source operand and is to indicate a register as a destination operand. The processor also includes means for loading data from the indicated memory location to the processor in response to the partial width load instruction. The processor also includes means for writing at least a portion of the loaded data to a partial width of the register in response to the partial width load instruction. The processor also includes means for finishing writing the register with a set of bits stored in a remaining width of the register that have bit values that depend on a partial width load mode of the processor. Optionally, the partial width load instruction does not indicate the partial width load mode.

Example 28 includes the processor of Example 27 and optionally in which the means for finishing writing the register includes means for writing zeros as the set of bits to the remaining width of the register in the partial width load mode.

Example 29 is a machine-readable storage medium storing an instruction that if executed by a machine is to cause the machine to perform the method of any of Examples 13-22.

Example 30 is a processor to perform the method of any of Examples 13-22.

Example 31 is a processor including means for performing the method of any of Examples 13-22.

Example 32 is a processor including integrated circuitry and/or logic and/or units and/or components and/or modules, or any combination thereof, to perform the methods of any of Examples 13-22.

Example 33 is a computer system including a dynamic random access memory (DRAM) and a processor, the computer system to perform the method of any of Examples 13-22.

Example 34 is a processor to perform at least one operation or a method substantially as described herein.

Example 35 is a processor including means for performing at least one operation or a method substantially as described herein.

Example 36 is a processor to execute or perform an instruction substantially as described herein.

Example 37 is a processor including means for performing an instruction substantially as described herein.

What is claimed is:

1. A processor comprising:
a register having a width;
a decode unit to receive a partial width load instruction, the partial width load instruction to indicate a memory location of a memory as a source operand and to indicate the register as a destination operand;
a memory subsystem coupled with the decode unit, the memory subsystem, in response to the partial width load instruction, to load data from the indicated memory location to the processor; and
a register write unit coupled with the memory subsystem and the register, the register write unit, in response to the partial width load instruction, to write at least a portion of the loaded data to a partial width of the register, and to finish writing the register with a set of bits stored in a remaining width of the register that have bit values that depend on a partial width load mode of the processor, the partial width load instruction not to indicate the partial width load mode.

2. The processor of claim 1, wherein the register write unit, in the partial width load mode, is to write all zeros as the set of bits to the remaining width of the register, and in a second partial width load mode, is not to write all zeros as the set of bits to the remaining width of the register.

3. The processor of claim 2, wherein the register write unit, in the second partial width load mode, is to write sign extension bits as the set of bits to the remaining width of the register.

4. The processor of claim 2, wherein the register write unit, in the second partial width load mode, is to finish writing the register with a set of bits that are initially to be in the remaining width, prior to the decoder receiving the partial width load instruction, stored as the set of bits in the remaining width of the register.

5. The processor of claim 1, further comprising at least one bit to indicate the partial width load mode, wherein the processor is to access the at least one bit to determine the partial width load mode and is to select a corresponding approach that determines the bit values for the set of bits.

6. The processor of claim 5, wherein the at least one bit is in a register of the processor and is application-visible.

7. The processor of claim 1, wherein the width of the register is at least as wide as memory addresses used by the processor to access memory, and wherein the partial width of the register is only a portion of the width of the register.

8. The processor of claim 7, wherein one selected from:
the processor is a 64-bit architecture processor that uses 64-bit memory addresses, and wherein the partial width of the register is 32-bits; and
the processor is a 128-bit architecture processor that uses 128-bit memory addresses, and wherein the partial width of the register is 64-bits.

9. The processor of claim 1, wherein the processor allows a user-level application to change the partial width load mode.

10. The processor of claim 1, wherein the processor allows at least one of an operating system and a virtual machine monitor to change the partial width load mode but does not allow user-level applications to change the partial width load mode.

11. The processor of claim 1, wherein the processor has an instruction set that includes an instruction to change the partial width load mode.

12. The processor of claim 1, wherein the register write unit, in the partial width load mode, is to write zeros as the set of bits to the remaining width of the register, and further comprising:
a unit of the processor to change the partial width load mode to a second partial width load mode at one of an interrupt and a transition from an application to an operating system.

13. A method performed by a processor comprising:
receiving a partial width load instruction, the partial width load instruction indicating a memory location of a memory as a source operand and indicating a register as a destination operand;
loading data from the indicated memory location to the processor in response to the partial width load instruction;
writing at least a portion of the loaded data to a partial width of the register in response to the partial width load instruction; and finishing writing the register with a set of bits stored in a remaining width of the register that have bit values that depend on a partial width load mode of the processor, the partial width load instruction not indicating the partial width load mode.

14. The method of claim 13, wherein finishing writing the register comprises writing zeros as the set of bits to the remaining width of the register in the partial width load mode, and wherein in a second, different partial width load mode sign extension bits instead of the zeroes would be written to the remaining width of the register.

15. The method of claim 13, wherein finishing writing the register comprises writing zeros as the set of bits to the remaining width of the register in the partial width load mode, and wherein in a second, different partial width load mode a set of bits initially in the remaining width would be stored in the remaining width of the register.

16. The method of claim 13, further comprising:
accessing at least one bit to determine the partial width load mode; and
selecting an approach corresponding to the partial width load mode that determines the bit values for the set of bits.

17. The method of claim 16, wherein accessing the at least one bit comprises accessing the at least one bit in an application-visible register of the processor.

18. The method of claim 13, wherein writing the partial width of the register comprises writing only a subset of a width of the register, and wherein the register is at least as wide as memory addresses used by the processor to access the memory.

19. The method of claim 18, wherein writing the partial width of the register comprises one of:
writing 32-bits of the register with zeros in a remainder of the register, and wherein the memory addresses used by the processor to access the memory are 64-bits; and
writing 64-bits of the register with zeros in a remainder of the register, and wherein the memory addresses used by the processor to access the memory are 128-bits.

20. The method of claim 13, further comprising:
receiving a control signal from a user-level application to change the partial width load mode; and
changing the partial width load mode after receiving the control signal.

21. The method of claim 13, further comprising:
receiving control signal from one of an operating system and a virtual machine monitor to change the partial width load mode;
changing the partial width load mode after receiving the control signal from said one of the operating system and the virtual machine monitor; and
preventing user-level applications from changing the partial width load mode.

22. An article of manufacture comprising a non-transitory machine-readable storage medium storing a set of instructions that if executed by a machine are operable to cause the machine to perform operations comprising:
examining metadata of a software module including examining an indication of a partial width load mode of a processor that is to be used by the processor to perform a partial width load instruction, the partial width load instruction to indicate a memory location as a source operand and to indicate a register as a destination operand; and
changing the partial width load mode of the processor to the indicated partial width load mode, in which changing the partial width load mode is to control a change in values of bits to be stored by the processor in a portion of the indicated register that is not to be used to store a partial width of data loaded from memory.

23. The article of manufacture of claim 22, wherein the set of instructions further comprise instructions that if executed by the machine are operable to cause the machine to perform operations comprising:
maintaining metadata indicating which different software modules are to use which different partial width load modes including that the software module is to use the partial width load mode; and
after handling an interrupt, changing the partial width load mode of the processor to the indicated partial width load mode in conjunction with a transition back to execution of code from the software module.

24. A system to process instructions comprising:
an interconnect;
a dynamic random access memory (DRAM) coupled with the interconnect; and
a processor coupled with the interconnect, the processor comprising:
a register having a width;
a decode unit to receive an instruction, the instruction to indicate a memory location of the DRAM as a source operand and to indicate the register as a destination operand;
a memory subsystem coupled with the decode unit, the memory subsystem, in response to the instruction, to load data from the indicated memory location; and
a unit coupled with the memory subsystem and the register, the unit, in response to the instruction, to write at least a portion of the loaded data to a partial width of the register, and to finish writing the register with a set of bits stored in a remaining width of the register that have bit values that depend on a mode of the processor, the instruction not to indicate the mode.

25. The system of claim 24, wherein the unit, in the partial width load mode, is to write zeros as the set of bits to the remaining width of the register, and in a second partial width load mode, is not to write zeroes as the set of bits to the remaining width of the register.

* * * * *